(12) United States Patent
Kamimura

(10) Patent No.: US 10,005,421 B2
(45) Date of Patent: Jun. 26, 2018

(54) VEHICLE FRONT PORTION STRUCTURE EQUIPPED WITH PEDESTRIAN AIRBAG DEVICE

(71) Applicant: TOYOTA JIDOSHA KABUSHIKI KAISHA, Toyota-shi, Aichi-ken (JP)

(72) Inventor: Shinya Kamimura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days. days.

(21) Appl. No.: 15/449,003

(22) Filed: Mar. 3, 2017

(65) Prior Publication Data

US 2017/0313277 A1    Nov. 2, 2017

(30) Foreign Application Priority Data

Apr. 28, 2016    (JP) .................................. 2016-091033

(51) Int. Cl.
*B60K 28/10*    (2006.01)
*B60R 21/36*    (2011.01)
*B62D 25/08*    (2006.01)

(52) U.S. Cl.
CPC ............ *B60R 21/36* (2013.01); *B62D 25/081* (2013.01)

(58) Field of Classification Search
CPC ............................... B62D 25/081; B60R 21/36
USPC ............................ 180/274; 280/728.1, 728.2
See application file for complete search history.

(56) References Cited

U.S. PATENT DOCUMENTS

| 9,834,172 B2* | 12/2017 | Hara | B60R 21/36 |
|---|---|---|---|
| 2003/0159875 A1 | 8/2003 | Sato et al. | |
| 2004/0074688 A1* | 4/2004 | Hashimoto | B60R 21/2155 180/271 |
| 2005/0205333 A1* | 9/2005 | Mori | B60R 21/36 180/274 |
| 2007/0262569 A1 | 11/2007 | Kikuchi et al. | |
| 2010/0164203 A1* | 7/2010 | Inoue | B60R 21/216 280/728.2 |
| 2010/0230944 A1* | 9/2010 | Narita | B60R 21/36 280/741 |
| 2010/0252351 A1* | 10/2010 | Okamoto | B60R 21/36 180/274 |
| 2014/0034406 A1* | 2/2014 | Kalliske | B60R 21/36 180/271 |

(Continued)

FOREIGN PATENT DOCUMENTS

JP    2003-252139 A    9/2003
JP    2007-302037 A    11/2007

*Primary Examiner* — Toan To
(74) *Attorney, Agent, or Firm* — Oliff PLC

(57) ABSTRACT

A vehicle front portion structure, equipped with a pedestrian airbag device, comprises: a cowl comprising a cowl panel and a cowl front panel extending in a forward direction from a front end portion of the cowl panel; an inflator disposed with a longitudinal direction of the inflator coinciding with a vehicle width direction and secured to the cowl front panel; an airbag disposed above the cowl front panel and deployed obliquely in a vehicle rearward and upward direction and outwardly in the vehicle width direction by gas from the inflator; and a support member having one end portion secured to a front suspension tower, extending toward the cowl, and secured to the cowl front panel on a vehicle front side relative to a rear end of the inflator in the vehicle frontward and rearward direction.

11 Claims, 17 Drawing Sheets

(56) References Cited

U.S. PATENT DOCUMENTS

| | | | |
|---|---|---|---|
| 2014/0291054 A1* | 10/2014 | Tanaka | B60R 21/36 180/274 |
| 2014/0291055 A1* | 10/2014 | Tanaka | B60R 21/36 180/274 |
| 2014/0318881 A1* | 10/2014 | Sugimoto | B60R 21/237 180/274 |
| 2015/0090516 A1* | 4/2015 | Kitte | B60R 21/36 180/274 |
| 2016/0229373 A1* | 8/2016 | Higashimachi | B60R 21/36 |
| 2016/0311395 A1* | 10/2016 | Hara | B60R 21/36 |

* cited by examiner

VEHICLE FRONT PORTION STRUCTURE EQUIPPED WITH PEDESTRIAN AIRBAG DEVICE

CROSS-REFERENCE TO RELATED APPLICATION

This application claims priority under 35 USC 119 from Japanese Patent Application No. 2016-91033, filed on Apr. 28, 2016, the disclosure of which is incorporated by reference herein in its entirety.

BACKGROUND

Technical Field

Preferred embodiments relate to a vehicle front portion structure equipped with a pedestrian airbag device.

Related Art

Japanese Patent Application Publication (JP-A) No. 2003-252139 discloses a pedestrian airbag device where an airbag module having an airbag and an inflator is disposed above a cowl panel configuring a cowl. The airbag module is fastened and secured to a front end portion of the cowl panel using stud bolts of the inflator.

SUMMARY

In this connection, in vehicles where a cowl front panel is disposed in the cowl so as to extend in the vehicle frontward direction from the front end portion of the cowl panel, there are cases where the airbag module is disposed above the cowl front panel.

The cowl front panel has a cantilever structure supported from the vehicle rear side, so at the time of airbag deployment, the reaction force acting on the inflator is applied to the cowl front panel, resulting in the cowl becoming deformed a great extent. As a result, there is the potential for the deployment direction of the airbag to no longer be stable.

In consideration of the circumstances described above, it is an object of preferred embodiments to provide a vehicle front portion structure equipped with a pedestrian airbag device that, in a structure where the inflator is disposed above the cowl front panel, can effectively control deformation of the cowl at the time of airbag deployment.

A vehicle front portion structure, that is equipped with a pedestrian airbag device, of a first aspect of the disclosure includes: a cowl, an inflator, an air bag, and a support member. The cowl comprises a cowl panel and a cowl front panel, and the cowl front panel extends in a forward direction from a front end portion in a vehicle frontward and rearward direction of the cowl panel. The inflator is disposed with its longitudinal direction coinciding with the vehicle width direction above the cowl front panel and is secured to the cowl front panel. The airbag is disposed above the cowl front panel and is inflated and deployed obliquely in a vehicle rearward and upward direction and outwardly in the vehicle width direction by gas discharged from the inflator. The support member has one end portion secured to a front suspension tower, extends toward the cowl, and is secured to the cowl front panel on a vehicle front side relative to a rear end of the inflator in the vehicle frontward and rearward direction.

According to the first aspect of the disclosure, the support member has one end portion secured to the strong and rigid front suspension tower and extends toward the cowl. The support member is secured to the cowl front panel on the vehicle front side relative to the rear end of the inflator. Here, when the airbag is supplied with gas from the inflator and inflates and deploys obliquely in the vehicle rearward and upward direction and outwardly in the vehicle width direction, reaction force in obliquely forward and downward direction and reaction force inwardly in the vehicle width direction act on the inflator. The cowl front panel is supported by the support member on the vehicle front side relative to the rear end of the inflator. Because of this, deformation of the cowl at the time of airbag deployment can be effectively controlled.

A vehicle front portion structure equipped with a pedestrian airbag device of a second aspect of the disclosure includes the first aspect, and moreover, the front suspension tower is configured to be placed on the vehicle front side of the inflator, and another end portion of the support member is secured to the cowl panel.

According to the second aspect of the disclosure, one end portion of the support member is secured to the front suspension tower placed on the vehicle front side of the inflator, and another end portion of the support member is secured to the cowl panel. The support member is secured to the cowl front panel on the vehicle front side relative to the rear end of the inflator. Because of this, vibration of the cowl front panel at the time when the inflator is activated can be allowed to escape via the support member to a member on the vehicle rear side such as the cowl panel.

A vehicle front portion structure equipped with a pedestrian airbag device of a third aspect of the disclosure includes the second aspect, and moreover, the cowl further comprises a cowl brace, the cowl panel includes a front wall, a rear wall, and a bottom wall, the cowl brace is secured to the front wall and the rear wall of the cowl panel, a chamber is formed by the front wall, the rear wall, the bottom wall and the cowl brace, and the other end portion of the support member is secured to a portion where the front wall and the cowl brace are secured to each other.

In the third aspect of the disclosure, the other end portion of the support member is secured to the portion where the front wall of the cowl panel and the cowl brace are secured to each other. The cowl brace is secured to the front wall and the rear wall of the cowl panel, and forms the chamber together with the front wall, the rear wall, and the bottom wall of the cowl panel. The portion where the front wall of the cowl panel and the cowl brace are secured to each other is reinforced by the chamber, so the other end portion of the support member is strongly supported. Because of this, the rigidity with which the cowl front panel is supported by the support member is improved, so deformation of the cowl at the time of airbag deployment can be even more effectively controlled.

A vehicle front portion structure equipped with a pedestrian airbag device of a fourth aspect of the disclosure includes any one of the first to third aspects, and moreover, the inflator is fastened and secured to the cowl front panel at at least two fastening portions aligned in the vehicle width direction, and the portion where the support member and the cowl front panel are secured to each other is aligned with at least one of the fastening portions within a region in the vehicle width direction where the inflator is placed.

According to the fourth aspect of the disclosure, the inflator is fastened and secured to the cowl front panel at the at least two fastening portions aligned in the vehicle width direction. As mentioned above, vehicle width direction inward reaction forces act on the inflator at the time of airbag deployment. The vehicle width direction inward reaction forces also act on the two fastening portions. With respect to this point, in the present aspect, one end portion of the support member is secured to the front suspension tower, and the portion where the support member and the cowl front panel are secured to each other is aligned with at least one of the fastening portions in the region in the vehicle width direction where the inflator is placed. Because of this, the vehicle width direction inward forces acting on the at least one fastening portion can be efficiently supported by the support member.

A vehicle front portion structure equipped with a pedestrian airbag device of a fifth aspect of the disclosure includes the fourth aspect, and moreover, the portion where the support member and the cowl front panel are secured to each other is placed between the two fastening portions.

In the fifth aspect of the disclosure, the inflator is fastened and secured to the cowl front panel at the at least two fastening portions aligned in the vehicle width direction, so the section of the cowl front panel between the two fastening portions is reinforced by the inflator. The portion where the support member and the cowl front panel are secured to each other is placed in this reinforced section. Because of this, compared to a case where this portion is placed away from the two fastening portions, the vehicle width direction inward forces acting on the fastening portions at the time of airbag deployment can be efficiently supported by the support member. Moreover, forces input to the front suspension tower at the time of normal travel are transmitted via the support member to the section reinforced by the inflator, so deformation of the cowl front panel at this reinforced section is controlled, and the support rigidity of the support member is improved. As a result, the front suspension member to which the one end portion of the support member is secured is reinforced by the support member, so the steering stability and riding performance of the vehicle can be improved.

A vehicle front portion structure equipped with a pedestrian airbag device of a sixth aspect of the disclosure includes any one of the first to fifth aspects, and moreover, the vehicle front portion structure has a right and left pair of the inflators aligned in the vehicle width direction, and the pair of inflators discharge gas from gas discharge portions disposed at vehicle width direction outer end portions of the inflators, and their vehicle width direction inner end portions are linked by a connection member.

According to the sixth aspect of the disclosure, the vehicle width direction inner end portions of the right and left pair of inflators are linked by the connection member. Because of this, when the right and left pair of inflators discharge gas from the gas discharge portions disposed in their vehicle width direction outer end portions, the reaction forces applied inward in the vehicle width direction to the respective inflators can be cancelled out.

A vehicle front portion structure equipped with a pedestrian airbag device of a seventh aspect of the disclosure includes any one of the first to fourth aspects, and moreover, the vehicle front portion structure has a right and left pair of the support members, each support member has one end portion secured to either one of a right and left pair of the front suspension towers, and the inflator is placed at the vehicle width direction central portion of the cowl front panel and discharges gas from a right and left pair of gas discharge portions disposed at both vehicle width direction end portions of the inflator.

According to the seventh aspect of the disclosure, the inflator is placed at the vehicle width direction central portion of the cowl front panel and discharges gas from the right and left pair of gas discharge portions disposed in both vehicle width direction end portions of the inflator. At this time, the reaction forces acting inward in the vehicle width direction on both end portions of the inflator can be cancelled out by the inflator itself. Furthermore, in the present aspect, the right and left pair of support members each has one end portion secured to either one of the right and left pair of front suspension towers, extend toward the cowl, and are secured to the cowl front panel on the vehicle front side relative to the rear end of the inflator. Because the present aspect is configured in this way, the portions where the right and left support members and the cowl front panel are secured to each other can be placed in the neighborhoods on the vehicle front sides of the right and left gas discharge portions of the inflator. Because of this, the obliquely forward and downward reaction forces applied to the right and left gas discharge portions at the time of airbag deployment can be efficiently supported by the right and left support members.

A vehicle front portion structure equipped with a pedestrian airbag device of an eighth aspect of the disclosure includes any one of the first to seventh aspects, and moreover, the support member has a support portion positioned obliquely on the vehicle front and lower side of the inflator, and the support portion is secured to the cowl front panel.

In the eighth aspect of the disclosure, the support portion is positioned in the acting direction of the reaction force that acts obliquely in the vehicle frontward and downward direction on the inflator at the time of airbag deployment. Because of this, the reaction force can be efficiently supported by the support portion.

A vehicle front portion structure equipped with a pedestrian airbag device of a ninth aspect of the disclosure includes any one of the first to eighth aspects, and moreover, the cowl panel has a front wall, a rear wall, and a bottom wall, a rear end portion of the cowl front panel being secured to a front flange disposed on an upper end portion of the front wall. The cowl further includes a cowl bracket, one end portion of the cowl bracket is secured to the rear end portion of the cowl front panel, the cowl bracket extends in the vehicle rearward direction, and the other end portion of the cowl bracket is secured to the bottom wall or the rear wall of the cowl panel.

In the ninth aspect of the disclosure, the rear end portion of the cowl front panel is secured to the front flange disposed at the upper end portion of the front wall of the cowl panel. The one end portion of the cowl bracket is secured to the rear end portion of the cowl front panel. The cowl bracket extends in the vehicle rearward direction, and the other end portion of the cowl bracket is secured to the bottom wall or the rear wall of the cowl panel. Because of this, the cowl front panel is supported from the vehicle rear side by the cowl bracket, so the support of the cowl front panel with respect to the obliquely forward and downward reaction force can be reinforced.

A vehicle front portion structure equipped with a pedestrian airbag device of a tenth aspect of the disclosure includes any one of the first to ninth aspects, and moreover, the one end portion of the support member is configured to be secured to a top wall of the front suspension tower.

According to the tenth aspect of the disclosure, the support member has the one end portion secured to the top wall of the front suspension tower and extends toward the cowl from the top wall. Because of this, the support member can be disposed on the vehicle upper side of parts (engine, transmission, auxiliaries, etc.) disposed in the area around the front suspension tower and the cowl, so it is easy to ensure space for disposing the support member, and the flexibility for setting the shape of the support member may be improved.

As described above, in the vehicle front portion structure equipped with a pedestrian airbag device of the preferred embodiments, deformation of the cowl at the time of airbag deployment can be effectively controlled in a structure where the inflator is disposed above the cowl front panel.

DETAILED DESCRIPTION

First Embodiment

Figure 1:
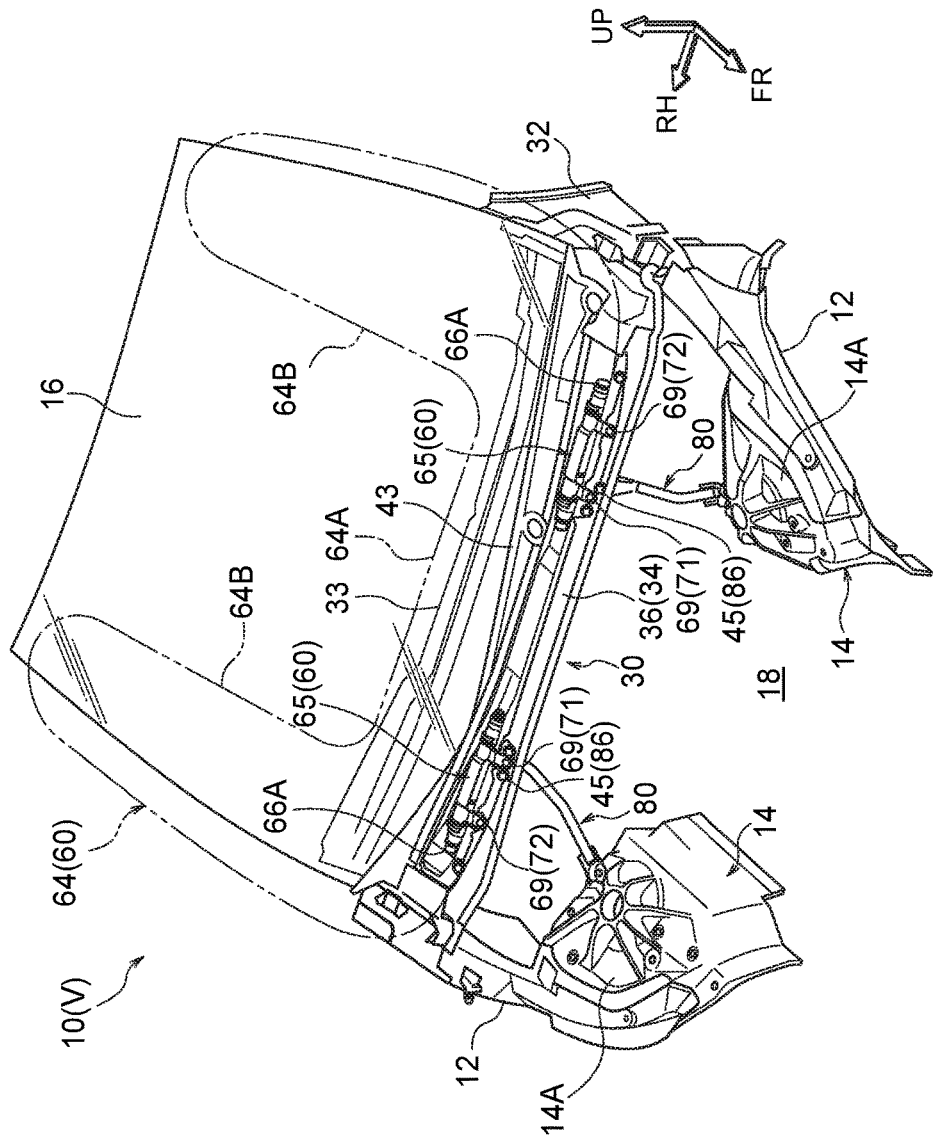
FIG. 1 is a perspective view showing a vehicle front portion structure equipped with a pedestrian airbag device pertaining to a first embodiment.

A vehicle front portion structure 10 equipped with a pedestrian airbag device (hereinafter abbreviated as "the vehicle front portion structure 10") pertaining to a first embodiment will be described on the basis of FIG. 1 to FIG. 15. It should be noted that there will be cases where the reference signs of some members are omitted from the drawings in order to make it easier to see what is shown in those drawings. Furthermore, arrow FR, arrow UP, and arrow RH appropriately shown in the drawings indicate a forward direction (traveling direction), an upward direction, and a rightward direction of the vehicle, respectively. Hereinafter, when description is given simply using the directions of front/rear, upper/lower, and right/left, unless otherwise specified these will be understood to mean front/rear in the vehicle frontward and rearward direction, upper/lower in the vehicle vertical direction, and right/left in the vehicle rightward and leftward direction (the vehicle width direction).

(Configuration)

Figure 2:
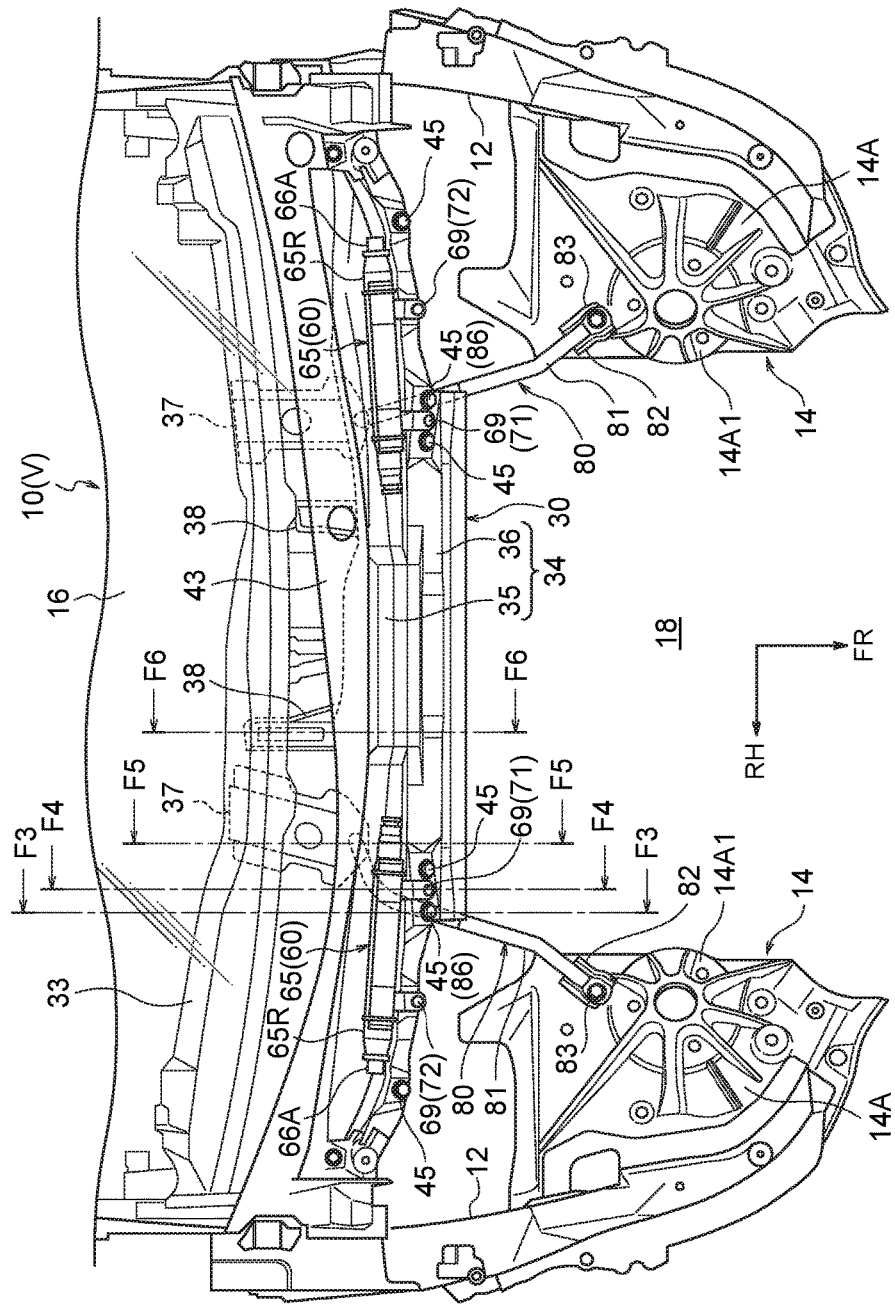
FIG. 2 is a plan view showing the vehicle front portion structure pertaining to a first embodiment.

As shown in FIG. 1 and FIG. 2, a front portion of a vehicle V to which the vehicle front portion structure 10 is applied is disposed with a right and left pair of apron upper members 12, a right and left pair of front suspension towers 14, a front windshield 16, a cowl 30, an airbag module 60, and a right and left pair of steering stabilizing braces (support members) 80. The airbag module 60 includes an airbag 64 and a right and left pair of inflators 65. Furthermore, as shown in FIG. 3 to FIG. 6, a hood 20 (not shown in FIG. 1 and FIG. 2) that closes an opening at the upper end of an engine compartment 18 is disposed in the front portion of the vehicle V. The vehicle front portion structure 10 is configured by the cowl 30, the airbag 64, the right and left pair of inflators 65, and the right and left pair of steering stabilizing braces 80. Each of these constituent elements will be described in detail below.

(Configurations of Apron Upper Members and Suspension Towers)

The right and left apron upper members 12 are each made by stamping a steel sheet, for example, and extends in the vehicle frontward and rearward direction on both right and left sides of the engine compartment 18. The right and left front suspension towers 14 are disposed at vehicle width direction inner sides and vehicle lower sides of the right and left apron upper members 12.

The right and left suspension towers 14 are aluminum castings, for example. Front suspensions (not shown in the drawings) for front wheels are housed in the right and left suspension towers 14. Suspension securing portions 14A1, to which the upper end portions of the front suspensions are fastened and secured, are disposed in the center portions of top walls 14A of the right and left suspension towers 14.

(Configuration of Hood)

The hood 20 is placed above the engine compartment 18. The hood 20 is configured by joining together outer peripheral edge portions of a hood outer panel 22 forming the design surface of the vehicle V and a hood inner panel 24 placed on a vehicle lower side of the hood outer panel 22. The hood outer panel 22 and the hood inner panel 24 are each made by stamping a steel sheet, for example.

(Configuration of Cowl)

The cowl 30 is placed at a vehicle rear side of the hood 20 and above a dash panel 28 that partitions the engine compartment 18 from a cabin 26, and the cowl 30 extends in the vehicle width direction. The cowl 30 includes a cowl panel 31, cowl side panels 32 (see FIG. 1), a cowl upper panel 33, a cowl front panel 34, a right and left pair of cowl braces 37 (see FIG. 2 and FIG. 5), and a right and left pair of cowl brackets 38 (see FIG. 2 and FIG. 6). Each of the constituent members of the cowl 30 is made by stamping a steel sheet, for example. It should be noted that in the present embodiment the right and left pair of cowl braces 37 are made of thicker steel sheets than those of the other constituent members of the cowl 30.

The cowl panel 31 extends in the vehicle width direction. As shown in FIG. 3 to FIG. 6, the cowl panel 31 has a cross-sectional hat shape whose vehicle upper side is open as seen in the vehicle width direction. Specifically, the cowl panel 31 is equipped with a front wall 31A and a rear wall 31B, which oppose each other in the substantially vehicle frontward and rearward direction, and a bottom wall 31C, which links lower end portions of the front wall 31A and the rear wall 31B in the substantially vehicle frontward and rearward direction. A front flange 31A1 that extends in the vehicle frontward direction is disposed at an upper end portion of the front wall 31A, and a rear flange 31B1 that extends in the vehicle rearward direction is disposed at an upper end portion of the rear wall 31B. The cowl side panels 32 (see FIG. 1) are joined to both vehicle width direction end portions of the cowl panel 31. The front flange 31A1 corresponds to a "front end portion of the cowl panel" in the present claims.

Figure 3:
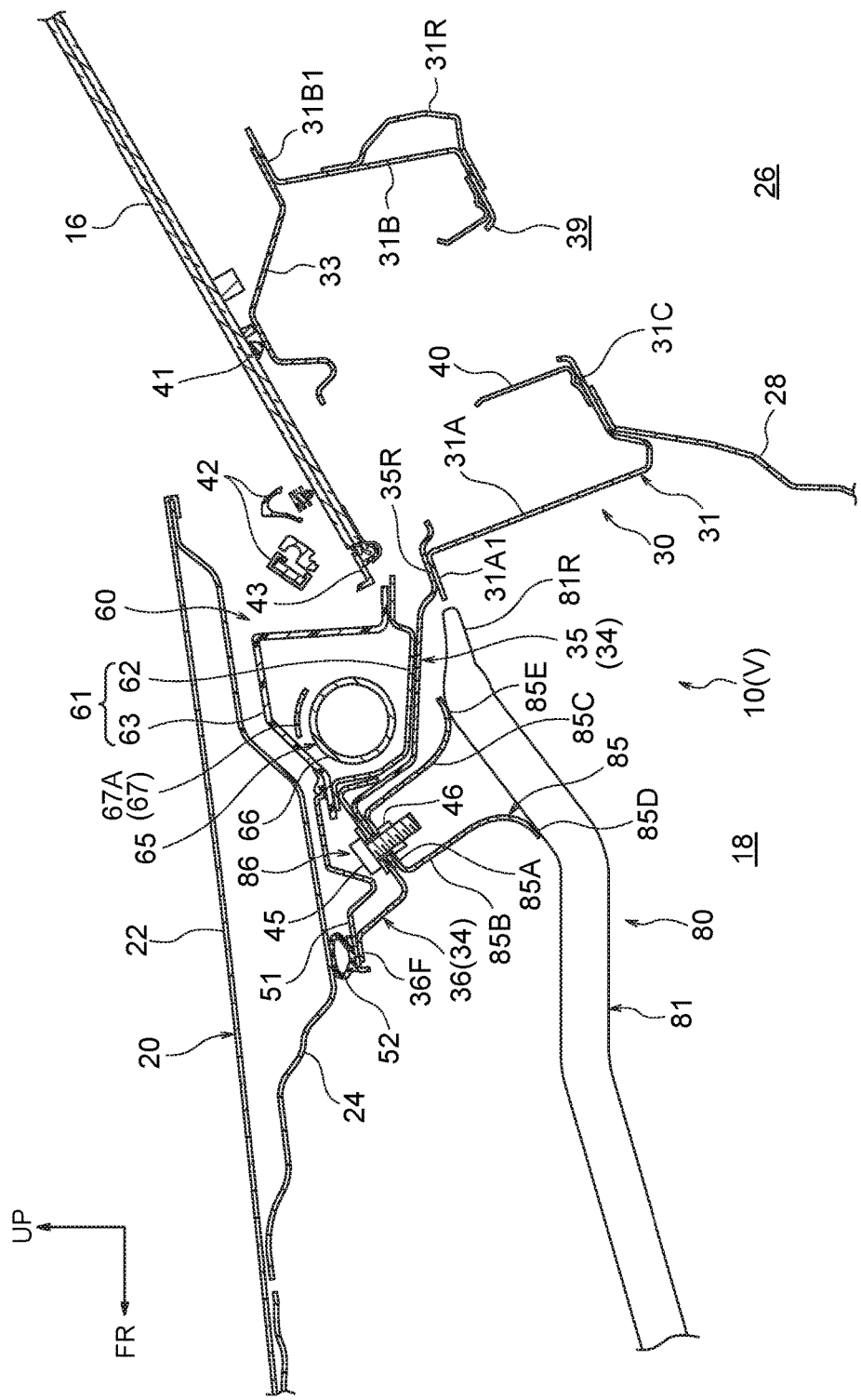
FIG. 3 is an enlarged cross-sectional view showing a cross section along line F3-F3 of FIG. 2.
Figure 4:
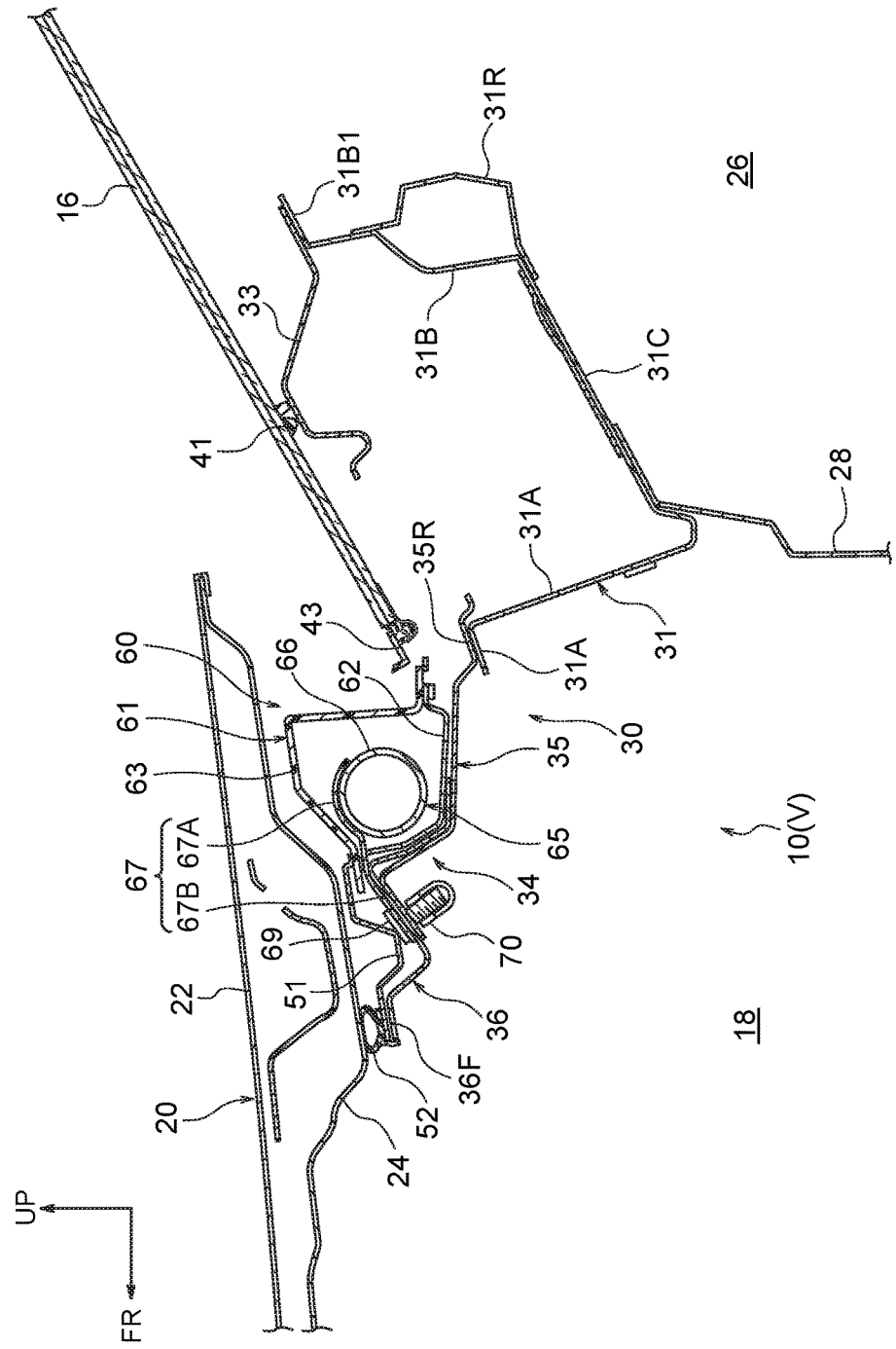
FIG. 4 is an enlarged cross-sectional view showing a cross section along line F4-F4 of FIG. 2.

An upper edge portion of the dash panel 28 is joined to a lower surface of a front portion of the bottom wall 31C of the cowl panel 31. Furthermore, a cowl panel reinforcement 31R is joined to a vehicle rear side of the cowl panel 31 in a state in which the cowl panel reinforcement 31R straddles the bottom wall 31C and the rear wall 31B. Furthermore, as shown in FIG. 3, openings 39 for air ducts are formed in parts of the bottom wall 31C of the cowl panel 31, and air duct brackets 40 are attached to an upper surface of the bottom wall 31C at the edge portions of the openings 39.

The cowl upper panel 33 extends in the vehicle width direction at a vehicle upper side of the cowl panel 31. The cowl upper panel 33 has a rear end portion joined to an upper surface of the rear flange 31B1 of the cowl panel 31 and extends in the vehicle frontward direction from the rear flange 31B1. The cowl upper panel 33 supports a lower end portion of the front windshield 16 via a seal member 41. It should be noted that wipers 42 (see FIG. 3, FIG. 5, and FIG. 6; not shown in FIG. 1, FIG. 2, and FIG. 7) are placed above the lower end portion of the front windshield 16, and a cowl louver 43 is coupled to the lower end of the front windshield 16.

As shown in FIG. 2 to FIG. 8, the cowl front panel 34 is configured by joining together a cowl front panel lower member 35 (hereinafter abbreviated as "the lower panel 35") and a cowl front panel upper member 36 (hereinafter abbreviated as "the upper panel 36"). The lower panel 35 extends in the vehicle width direction at a vehicle front side of the cowl panel 31. The lower panel 35 has a rear end portion 35R joined to an upper surface of the front flange 31A1 of the cowl panel 31 and extends in the vehicle frontward direction from the front flange 31A1. The lower panel 35 extends in the vehicle frontward direction beyond the front windshield 16 and is placed under a rear edge portion of the hood 20. The rear end portion 35R corresponds to a "rear end portion of the cowl front panel" in the present claims.

The upper panel 36 extends in the vehicle width direction at a vehicle front side of the lower panel 35. A rear portion of the upper panel 36 is laid on top of an upper surface of a front portion of the lower panel 35, and a front portion of the upper panel 36 extends in the vehicle frontward direction beyond the lower panel 35. The upper panel 36 is fastened and secured to the front portion of the lower panel 35 using plural bolts 45 and weld nuts 46 aligned in the vehicle width direction. A front end portion 36F of the upper panel 36 supports a hood seal 52 via a later-described resin cover 51.

Figure 5:
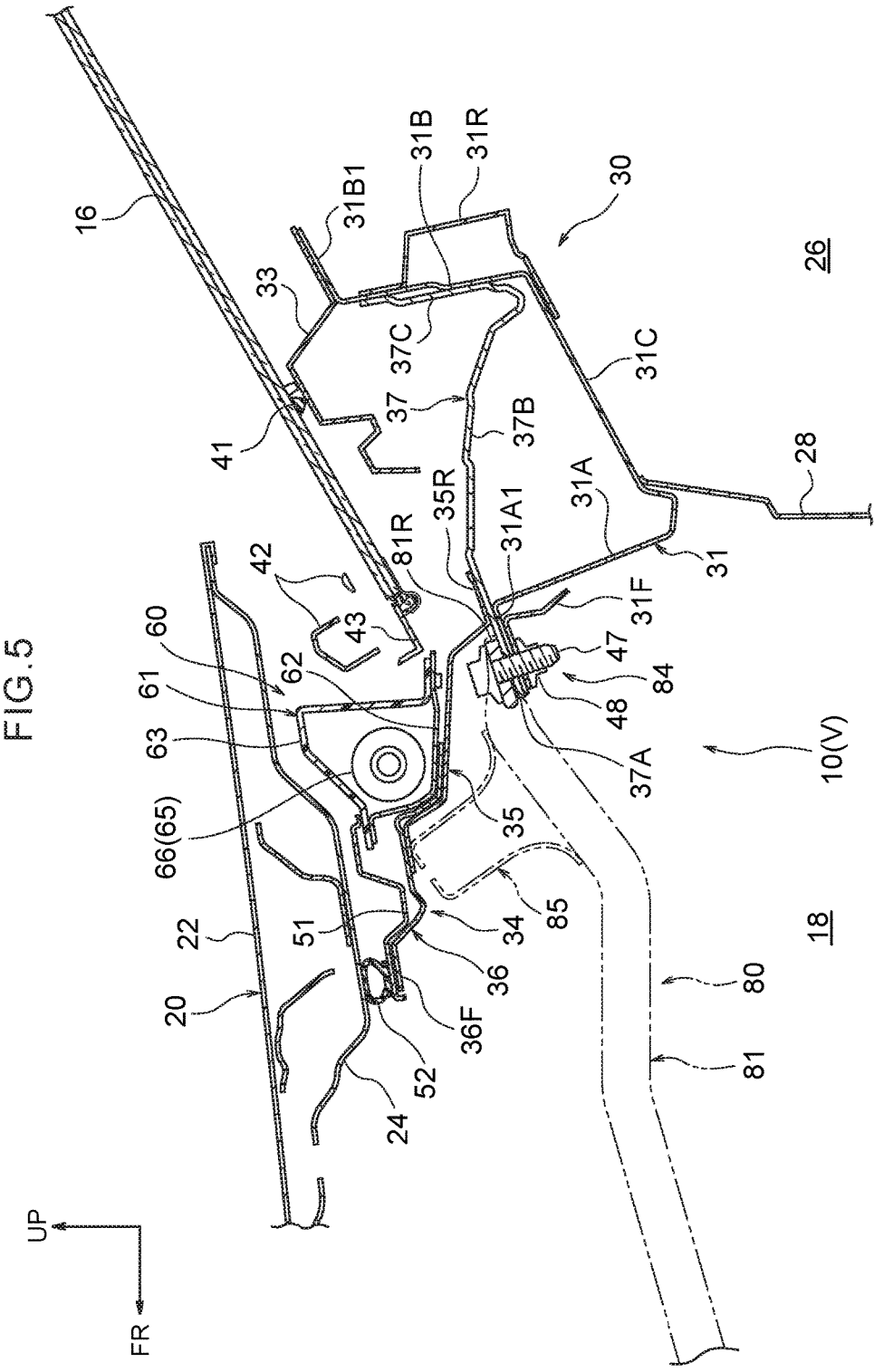
FIG. 5 is an enlarged cross-sectional view showing a cross section along line F5-F5 of FIG. 2.
Figure 6:
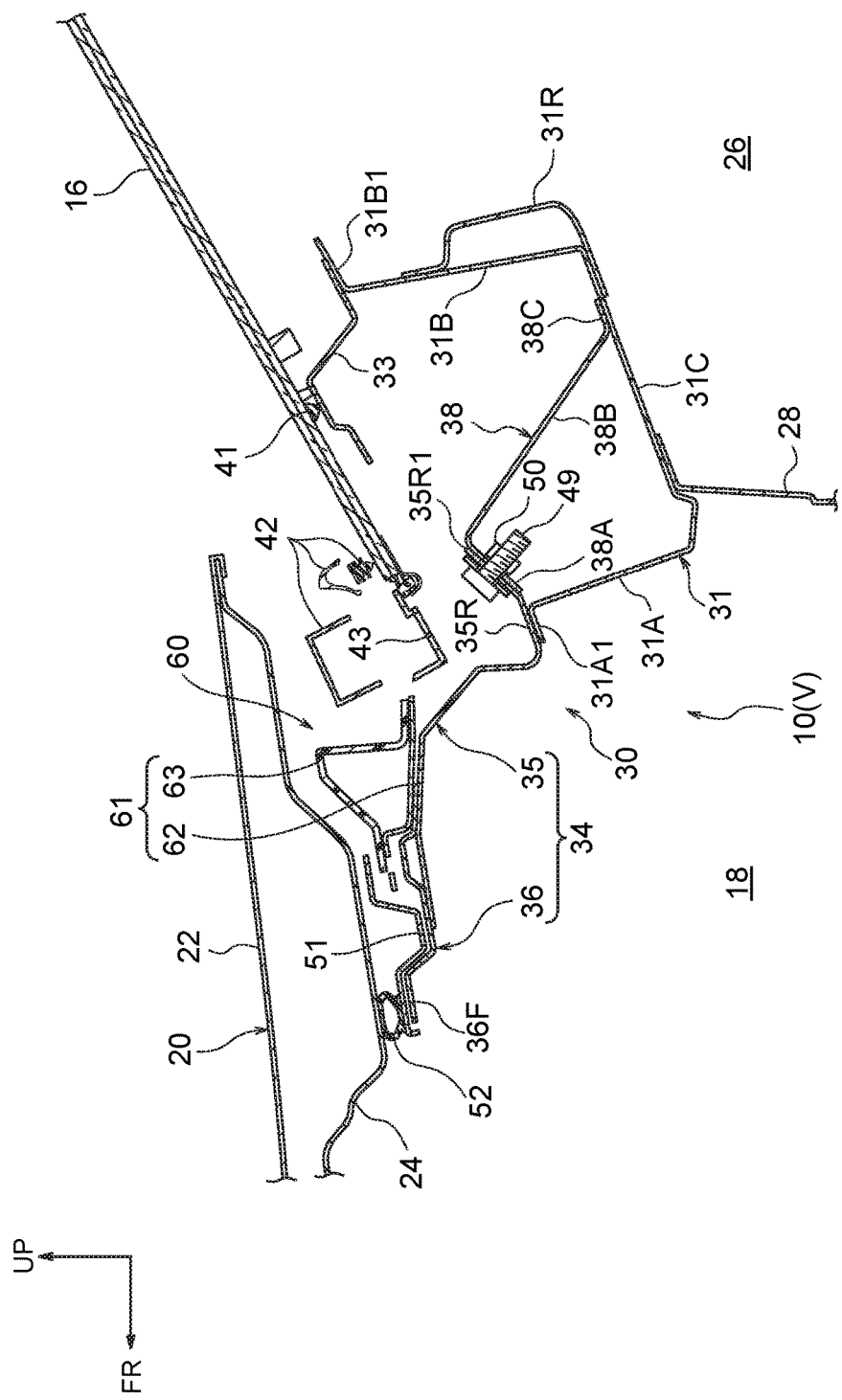
FIG. 6 is an enlarged cross-sectional view showing a cross section along line F6-F6 of FIG. 2.
Figure 12:
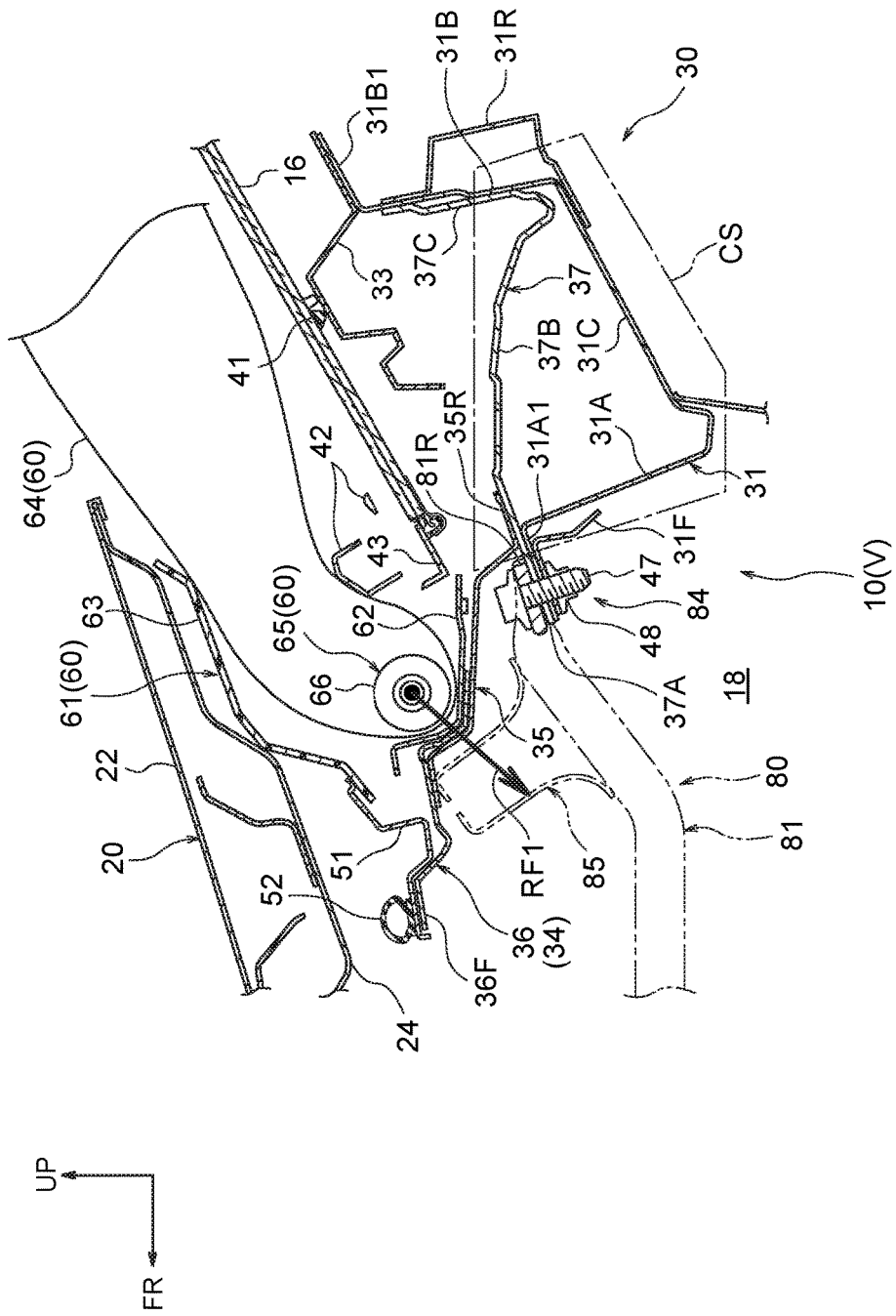
FIG. 12 is a cross-sectional view, corresponding to part of FIG. 5, for describing the obliquely forward and downward reaction forces acting on the inflators at the time of airbag deployment.

As shown in FIG. 2, the right and left cowl braces 37 are placed on both right and left sides relative to a vehicle width direction center of the vehicle V and a little on vehicle width direction inner sides of the right and left suspension towers 14. As shown in FIG. 5, each cowl brace 37 bridges the front wall 31A and the rear wall 31B of the cowl panel 31 and is secured to the front wall 31A and the rear wall 31B. Specifically, each cowl brace 37 has a front fastening portion 37A that is laid on top of the upper surface of the front flange 31A1, a brace body 37B that extends in the vehicle rearward direction from a rear end of the front fastening portion 37A, and a rear joining portion 37C that extends in the vehicle upward direction from a rear end of the brace body 37B and is joined to a front surface of the rear wall 31B. The front fastening portion 37A is fastened and secured to the front flange 31A1 and a later-described reinforcement bracket 31F using a bolt 47 and a weld nut 48. Each cowl brace 37, together with the front wall 31A, the rear wall 31B, and the bottom wall 31C, forms a chamber. Namely, a region CS surrounded by the long dashed short dashed line is formed as indicated in FIG. 12.

As shown in FIG. 2, the right and left cowl brackets 38 are placed on both right and left sides relative to the vehicle width direction center of the vehicle V and on the vehicle width direction central sides of the right and left cowl braces 37. In correspondence to these cowl brackets 38, a right and left pair of bracket fastening portions 35R1 (see FIG. 6) that extend in the vehicle rearward direction are formed at the rear end portion 35R of the cowl front panel 34. The cowl brackets 38 bridge the bracket fastening portions 35R1 and the bottom wall 31C of the cowl panel 31 and are secured to the bracket fastening portions 35R1 and the bottom wall 31C.

Specifically, each cowl bracket 38 has a front fastening portion 38A that is laid at a lower surface of the bracket fastening portion 35R1 and is fastened and secured to the bracket fastening portion 35R1 using a bolt 49 and nut 50, a bracket body 38B that extends obliquely in the vehicle rearward and downward direction from a rear end of the front fastening portion 38A, and a rear joining portion 38C that extends obliquely in the vehicle rearward and upward direction from a lower end of the bracket body 38B and is joined to an upper surface of the bottom wall 31C of the cowl panel 31. It should be noted that in the present embodiment the right and left cowl braces 37 and the right and left cowl brackets 38 are formed in bilaterally asymmetrical shapes, but they are not limited to this and may also be formed in bilaterally symmetrical shapes. Furthermore, in the present embodiment the rear joining portions 38C of the right and left cowl brackets 38 are joined to the bottom wall 31C, but the rear joining portions 38C are not limited to this and may also be joined to the rear wall 31B.

(Configuration of Airbag Module)

The airbag module 60 configures the main part of a pedestrian protecting airbag device and is disposed above the cowl front panel 34. The airbag module 60 includes an airbag cover 61 (see FIG. 3 to FIG. 6; not shown in FIG. 1, FIG. 2, and FIG. 7), the airbag 64 (see FIG. 1; not shown in FIG. 2 to FIG. 7), and a right and left pair of inflators 65.

As shown in FIG. 3 to FIG. 6, the airbag cover 61 has a cover lower member 62 and a cover upper member 63 and extends in the vehicle width direction. The cover lower member 62 is made by stamping sheet metal, for example, and has a substantially hat shape whose vehicle upper side is open as seen in the vehicle width direction. The cover upper member 63 is made of resin, for example, and has a substantially hat shape whose vehicle lower side is open as seen in the vehicle width direction. The cover lower member 62 and the cover upper member 63 have flange portions laid on top of each other and are joined to each other by means such as claw fitting or double-sided pressure-sensitive adhesive tape. Because of this, the airbag cover 61 is formed as a substantially rectangular hollow body as seen in the vehicle width direction.

It should be noted that a bulging portion (assigned no reference sign) that bulges in the vehicle upward direction at a vehicle front side of the airbag cover 61 is disposed at the cowl front panel 34. Furthermore, a resin cover 51 is disposed at a vehicle front side of the airbag cover 61, and the front portion of the cowl front panel 34 is covered from the vehicle upper side by the resin cover 51. The resin cover 51 bridges an upper surface of a front edge portion of the cover upper member 63 and an upper surface of the front end portion 36F of the upper panel 36 of the cowl front panel 34 and is secured to the cover upper member 63 and the front end portion 36F by means such as claw fitting or double-sided pressure-sensitive adhesive tape. A hood seal 52 made of rubber, for example, is attached to the upper surface of the front end portion of the resin cover 51.

Inside the airbag cover 61 are housed the airbag 64 (see FIG. 1) and the right and left pair of inflators 65. The airbag 64 is, for example, formed as a substantially C-shaped bag by laying two base cloths and sewing their outer peripheral portions together. The airbag 64 is inflated and deployed obliquely in the vehicle rearward and upward direction and outwardly in the vehicle width direction from a gap between a rear end portion of the hood 20 and the lower end portion of the front windshield 16 by gas discharged from the right and left inflators 65. It should be noted that arrows ED1 and arrows ED2 in FIG. 10 indicate the directions in which the airbag 64 inflates and deploys.

In a state in which the airbag 64 has inflated and deployed, as shown in FIG. 1, a bag body 64A of the airbag 64 extends in the vehicle width direction along the lower end portion of the front windshield 16, and a front surface of the lower end portion of the front windshield 16 is covered by the bag body 64A. Furthermore, a right and left pair of bag side portions 64B extend obliquely in the vehicle rearward and upward direction from both vehicle width direction end portions of the bag body 64A, and both vehicle width direction end portions of the front windshield 16 and front surfaces of a right and left pair of front pillars (not shown in the drawings) are covered by the bag side portions 64B. The airbag 64 is housed inside the airbag cover 61 in a state in which the airbag 64 has been folded up by a predetermined folding method such as accordion folding or roll folding. It should be noted that FIG. 2 to FIG. 7 do not show the airbag 64 in its folded-up state. Furthermore, the deployed shape of the airbag 64 described above is an example and can be appropriately changed.

The right and left inflators 65 are placed with their longitudinal direction coinciding with the vehicle width direction at both right and left sides relative to the vehicle width direction center of the vehicle V. The right and left inflators 65 are aligned and apart with an interval from each other in the vehicle width direction inside the airbag cover 61. As shown in FIG. 2, the right and left inflators 65 are placed at the vehicle rear side and a little on the vehicle width direction inner sides with respect to the right and left suspension towers 14. The inflators 65 each includes an inflator body 66 and attachment bracket 67.

The inflator body 66 is so-called cylinder type and is placed in a posture where its axial direction lies along the substantially vehicle width direction. The attachment bracket 67 is made by stamping sheet metal, for example, and has a bracket body 67A curved in a circular arc shape as seen in the vehicle width direction. The bracket body 67A is placed on a vehicle upper side of the inflator body 66 and is secured to the inflator body 66 by a right and left pair of securing bands (metal bands) 68 wrapped around an outer peripheral surface of the inflator body 66.

A right and left pair of fastening pieces 67B extend in the vehicle frontward direction from a front edge of the bracket body 67A. The right and left pair of fastening pieces 67B are placed an interval apart from each other in the vehicle width direction. The front portions of the right and left pair of fastening pieces 67B are laid on top of the upper surface of the front portion of the cowl front panel 34 and are fastened and secured to the front portion of the cowl front panel 34 using a right and left pair of weld bolts 69 and nuts 70. Because of this, each inflator 65 is fastened and secured to the front portion of the cowl front panel 34 at a vehicle front side relative to the inflator body 66. It should be noted that in the following description, among the right and left pair of fastening portions where the inflator 65 and the cowl front panel 34 are fastened and secured to each other, the fastening portion on the vehicle width direction inner side will be called an "inner fastening portion 71" and the fastening portion on the vehicle width direction outer side will be called an "outer fastening portion 72." The inner fastening portion 71 and the outer fastening portion 72 correspond to "two fastening portions" in the present claims.

A squib (explosive device) (not shown in the drawings) is disposed in a vehicle width direction inner end portion of each inflator 65. Moreover, the inside of each inflator 65 is charged with a gas generant that generates a large quantity of gas upon burning. Furthermore, a gas discharge portion 66A is disposed in a vehicle width direction outer end of each inflator 65. Plural gas discharge holes are formed at a peripheral wall of each gas discharge portion 66A, and gas is discharged from the plural gas discharge holes when each inflator 65 is activated. It should be noted that, although the inflators 65 of the present embodiment uses a gas generant, an inflator having a high-pressure gas sealed therein may also be used.

The inflators 65 are electrically connected to a controller (airbag ECU) (not shown in the drawings) disposed near a central portion of the floor of the cabin 26. The controller is electrically connected to an impact detection sensor (not shown in the drawings) disposed in a front bumper (not shown in the drawings) of the vehicle V or an impact prediction sensor (not shown in the drawings). As the impact detection sensor, for example, a chamber type, where a long pressure tube or pressure chamber and a pressure sensor are disposed along the front bumper at a front surface side of a front bumper reinforcement, or an optical fiber type can be applied. Furthermore, as the impact prediction sensor, for example, a pre-crash sensor that uses millimeter-wave radar or a stereo camera to predict a collision with an impactor such as a pedestrian can be applied.

The controller outputs an activation signal to the right and left inflators 65 when it has detected or predicted an impact with a pedestrian on the basis of the output from the impact detection sensor or the impact prediction sensor. Because of this, gas is discharged from the gas discharge portions 66 of the inflators 65 to the inside of the airbag 64, and the airbag 64 inflates and deploys. At this time, among the front end portion and the rear end portion of the hood 20, at least the rear end portion is pushed up in the vehicle upward direction by pop-up hood devices (not shown in the drawings) (see FIG. 11, FIG. 12, and FIG. 15). Furthermore, at this time, the cover upper member 63 of the airbag cover 61 receives the inflation pressure of the airbag 64 and becomes separated from the cover lower member 62.

(Configuration of Steering Stabilizing Braces)

The right and left pair of steering stabilizing braces 80 are members for improving the steering stability of the vehicle V, and bridge the right and left suspension towers 14 and the cowl 30 along the vehicle frontward and rearward direction. Each steering stabilizing brace 80 has a brace body 81 serving as a member body that is made of a metal pipe or the like in a long shape and is placed with its longitudinal direction coinciding with the vehicle frontward and rearward direction, a securing bracket 82 serving as a suspension tower securing portion secured to the front end portion of the brace body 81, and a bracket 85 serving as a support portion secured to the rear end side of the brace body 81.

Each securing brackets 82 is placed at vehicle rear side of the suspension securing portion 14A1 and on an upper surface of the top wall 14A of the respective suspension towers 14. The securing bracket 82 is made by stamping sheet metal, for example, and has its rear portion secured to the front end portion of the brace body 81 by means such as welding. A bolt hole (not shown in the drawings) is formed at the front portion of the securing bracket 82, and a bolt 83 inserted through the bolt hole is inserted through a bolt hole (not shown in the drawings) formed at the top wall 14A and screwed into a nut (not shown in the drawings). Because of this, the securing brackets 82 each that is, the front end portion of the steering stabilizing brace 80 is fastened and secured at the top wall 14A of the suspension tower 14.

Each brace body 81 extends toward the cowl 30 from the securing bracket 82. Specifically, the bracket body 81 extends in the vehicle rearward direction and a little inward in the vehicle width direction from the securing bracket 82, and the rear end side of the brace body 81 is placed at a vehicle lower side of the cowl front panel 34. Longitudinal direction rear end portion of the brace body 81, which is the rear end portion of the steering stabilizing brace 80, is placed at a vehicle front side of the cowl brace 37.

Figure 8:
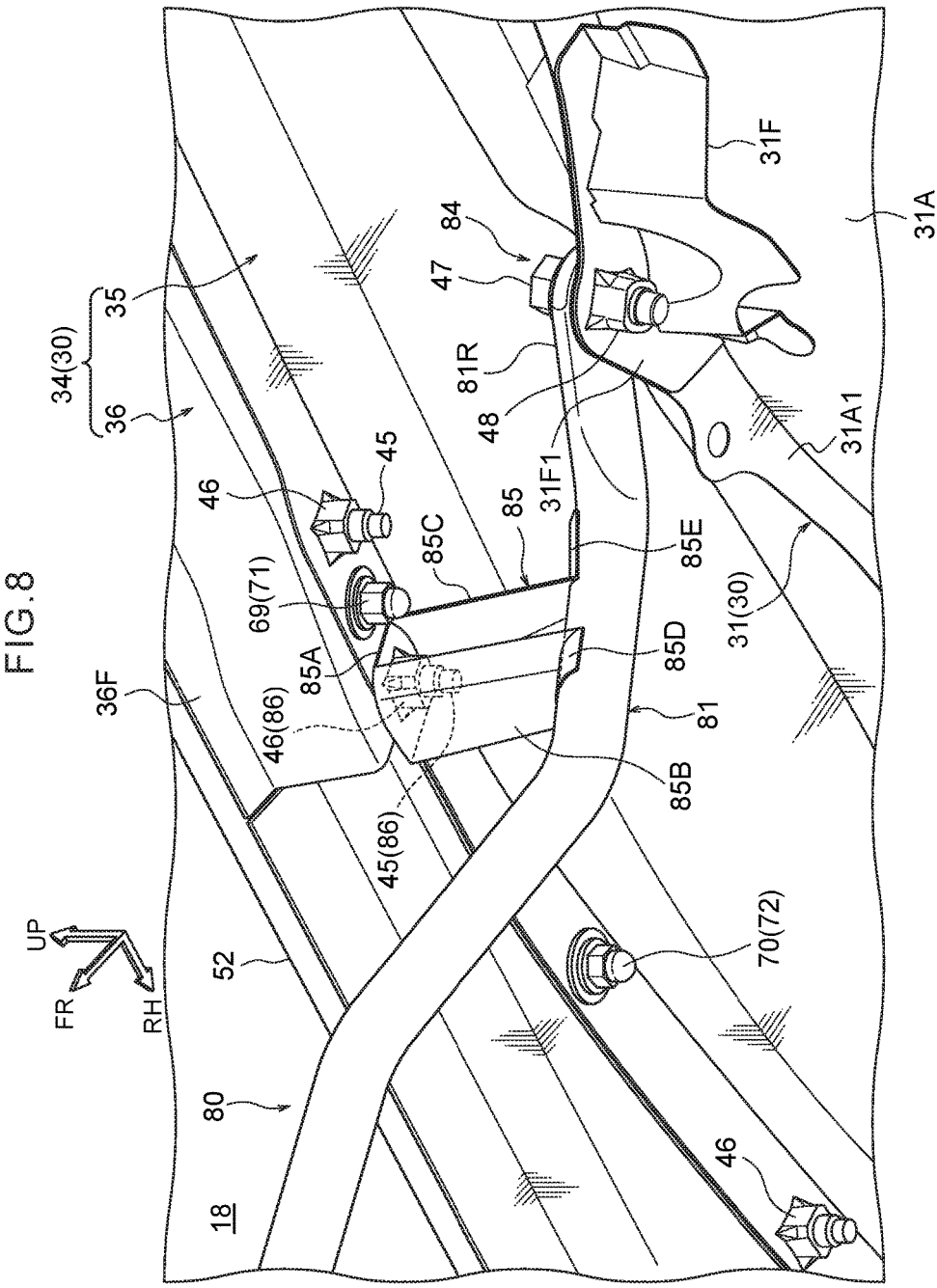
FIG. 8 is a perspective view of the configuration shown in FIG. 7 as seen from the vehicle lower side.
Figure 9:
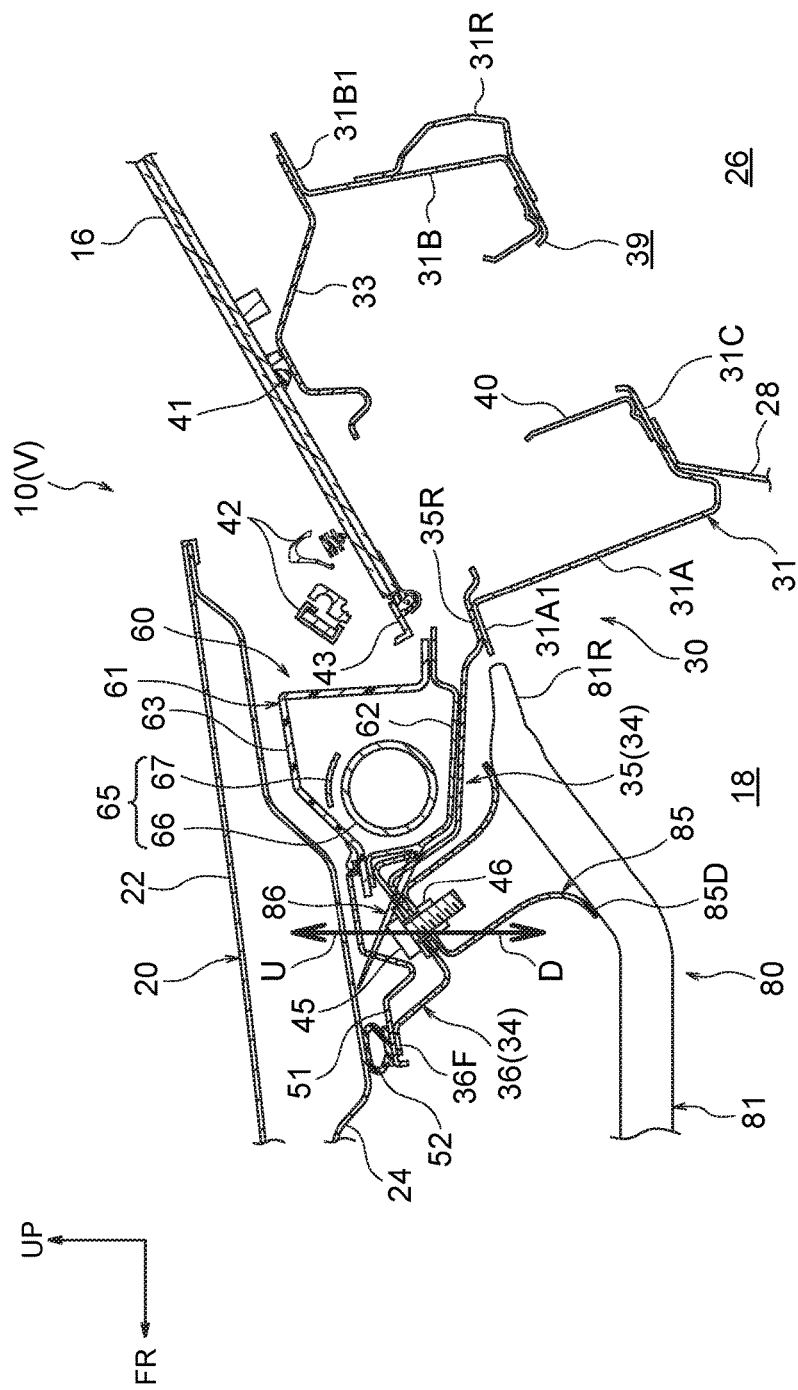
FIG. 9 is a cross-sectional view, corresponding to part of FIG. 3, for describing the suppression of vibration of a cowl front panel at the time of normal travel.

As shown in FIG. 5 and FIG. 8, a cowl fastening portion 81R crushed into flat plate shape is formed at the rear end portion of each of the brace bodies 81. The cowl fastening portion 81R is laid on top of the upper surface of the front fastening portion 37A of the cowl brace 37 and is fastened and secured at the front fastening portion 37A and the front flange 31A1 of the cowl panel 31 using the bolt 47 and the weld nut 48. Because of this, the right and left suspension towers 14 are connected via the right and left steering stabilizing braces 80 to the sections of the cowl 30 where the right and left cowl braces 37 are disposed. Hereinafter, the portions where each of the cowl fastening portions 81R, each of the front fastening portions 37A, and each of the front flange 31A1 are fastened to each other will be called "cowl brace securing portions 84."

It should be noted that a reinforcement bracket 31F is placed at a vehicle lower side of the respective cowl brace securing portions 84. The reinforcement bracket 31F is joined to the front surface of the front wall 31A of the cowl panel 31, and a flange 31F1 disposed at an upper end portion of the reinforcement bracket 31F is laid at a lower surface of the front flange 31A1. The weld nut 48 is joined to the lower surface of the flanges 31F1, such that the flange 31F1, the front flange 31A1, the front fastening portion 37A, and the cowl fastening portion 81R are fastened and secured to each other in a four-layer stacked state. The cowl brace securing portions 84 are each reinforced by the reinforcement bracket 31F.

A bracket 85 is disposed at a rear end side of the respective brace bodies 81, at a vehicle front side of the cowl fastening portion 81R. The bracket 85 is respectively placed under the front portions of the cowl front panel 34 and a little on vehicle width direction outer sides of the inner fastening portions 71 of the respective inflators 65. Each bracket 85 extends in the vehicle upward direction from an upper surface of the brace body 81. Each bracket 85 is positioned obliquely at the vehicle front and lower side of the inflator 65. Each bracket 85 is made by stamping sheet metal, for example, and has substantially hat shape as seen in the vehicle width direction.

Specifically, each bracket 85 is formed by an upper fastening portion 85A that is laid at the lower surface of the front portion of the cowl front panel 34, a front leg 85B and a rear leg 85C that extend in the vehicle downward direction from both front and rear ends of the upper fastening portion 85A, a front joining portion 85D that extends in the vehicle frontward direction from the lower end of the front leg 85B, and a rear joining portion 85E that extends in the vehicle rearward direction from the lower end of the rear leg 85C. It should be noted that the configuration of the brackets 85 is not limited to what is described above and can be appropriately changed. For example, each bracket 85 may also has a configuration where the rear leg 85C and the rear joining portion 85E are omitted. Furthermore, the material of the brackets 85 (support portions) is not limited to sheet metal, and the brackets 85 may also be made of metal pipes or the like.

The front joining portion 85D and the rear joining portion 85E are laid on top of the upper surface of the brace body 81 and are joined to the brace body 81 by means such as welding. The upper fastening portion 85A is fastened and secured to the cowl front panel 34 using sets of the plural bolts 45 and weld nuts 46 that fasten the lower panel 35 and the upper panel 36 of the cowl front panel 34 to each other. Because of this, the front portion of the cowl front panel 34 is supported from the vehicle front sides and the vehicle lower sides of the inflators 65 by the brackets 85 that is, the steering stabilizing braces 80.

It should be noted that in the following description the each portion where the bracket 85 and the cowl front panel 34 are fastened and secured to each other will be called "steering stabilizing brace securing portion 86." The steering stabilizing brace securing portion 86 corresponds to a "portion where the support member and the cowl front panel are secured to each other" in the present claim. The steering stabilizing brace securing portions 86 each is positioned at the vehicle front side of the inflator bodies 66 and is placed at the vehicle front side relative to a rear end 65R of the inflator 65 (see FIG. 2 and FIG. 10). The respective rear ends 65R are the sections of the inflator bodies 66 positioned furthest in the vehicle rearward direction in the vehicle frontward and rearward direction. In the present embodiment, the inflator bodies 66 are slanted a little relative to the vehicle width direction so that they become positioned more in the vehicle rearward direction heading outward in the vehicle width direction, so the rear ends 65R of the inflators 65 are positioned on the vehicle width direction outer end portions of the inflator bodies 66.

Figure 7:
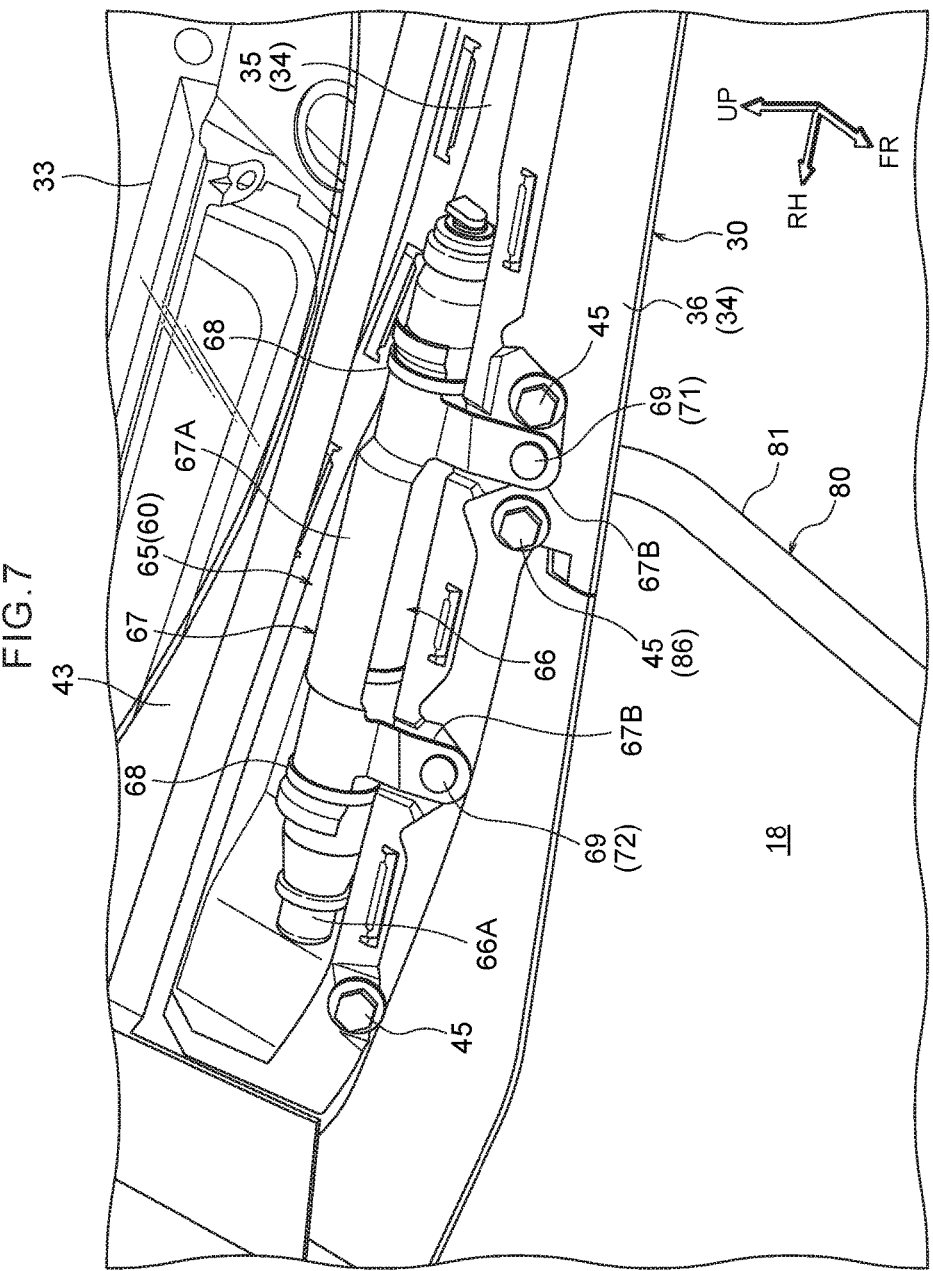
FIG. 7 is an enlarged perspective view showing part of FIG. 1.
Figure 10:
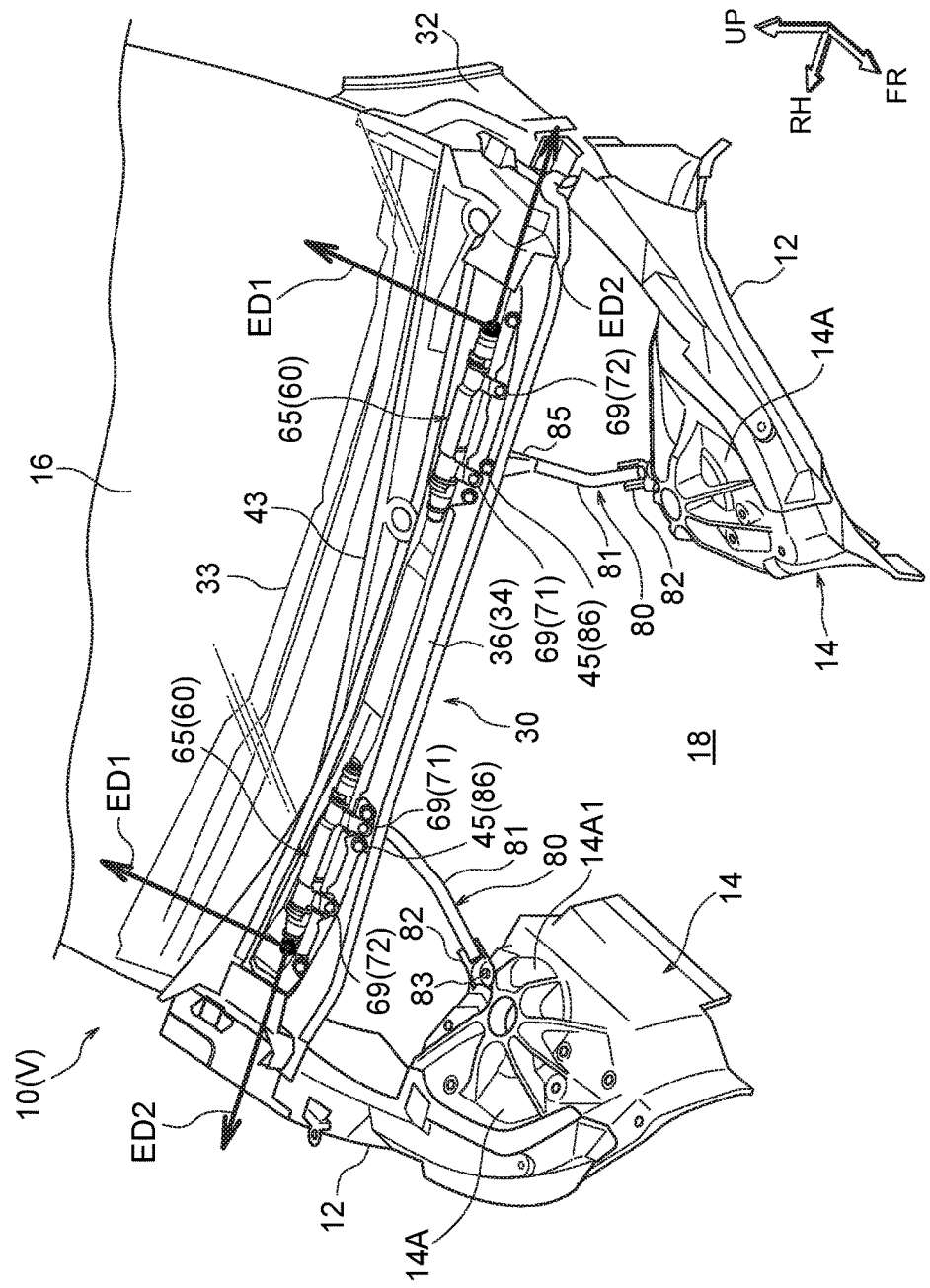
FIG. 10 is an enlarged perspective view showing part of FIG. 1 and is for describing the deployment direction of an airbag.

Furthermore, as shown in FIG. 2, FIG. 7, and FIG. 10, the steering stabilizing brace securing portions 86 are placed in alignment in the vehicle width direction with the inner fastening portions 71 and the outer fastening portions 72 within regions in the vehicle width direction where the inflators 65 are placed. Specifically, each steering stabilizing brace securing portion 86 is placed between the inner fastening portion 71 and the outer fastening portion 72 of either one of the inflators 65 and is placed adjacent to the vehicle width direction outer side of the inner fastening portion 71.

It should be noted that in the present embodiment, as shown in FIG. 2, the right and left steering stabilizing braces 80 are formed in bilaterally asymmetrical shapes, but the right and left steering stabilizing braces 80 are not limited to this and may also be formed in bilaterally symmetrical shapes. Furthermore, in the present embodiment, one or plural bends are formed in the brace bodies 81 of the right and left steering stabilizing braces 80, but the brace bodies 81 are not limited to this and may also be formed in straight shapes. Furthermore, the shape of the right and left steering stabilizing braces 80 can be appropriately changed depending on their relationship with parts (engine, transmission, auxiliaries, etc.) disposed inside the engine compartment 18.

(Action and Effects)

Next, the action and effects of the present embodiment will be described.

In the vehicle front portion structure 10 having the configuration described above, the steering stabilizing braces 80, whose front end portions are secured to the strong and rigid suspension towers 14, extend toward the cowl 30. The steering stabilizing braces 80 are secured to the cowl front panel 34 at the vehicle front sides relative to the rear ends 65R of the inflators 65 and support the front portion of the cowl front panel 34.

Figure 11:
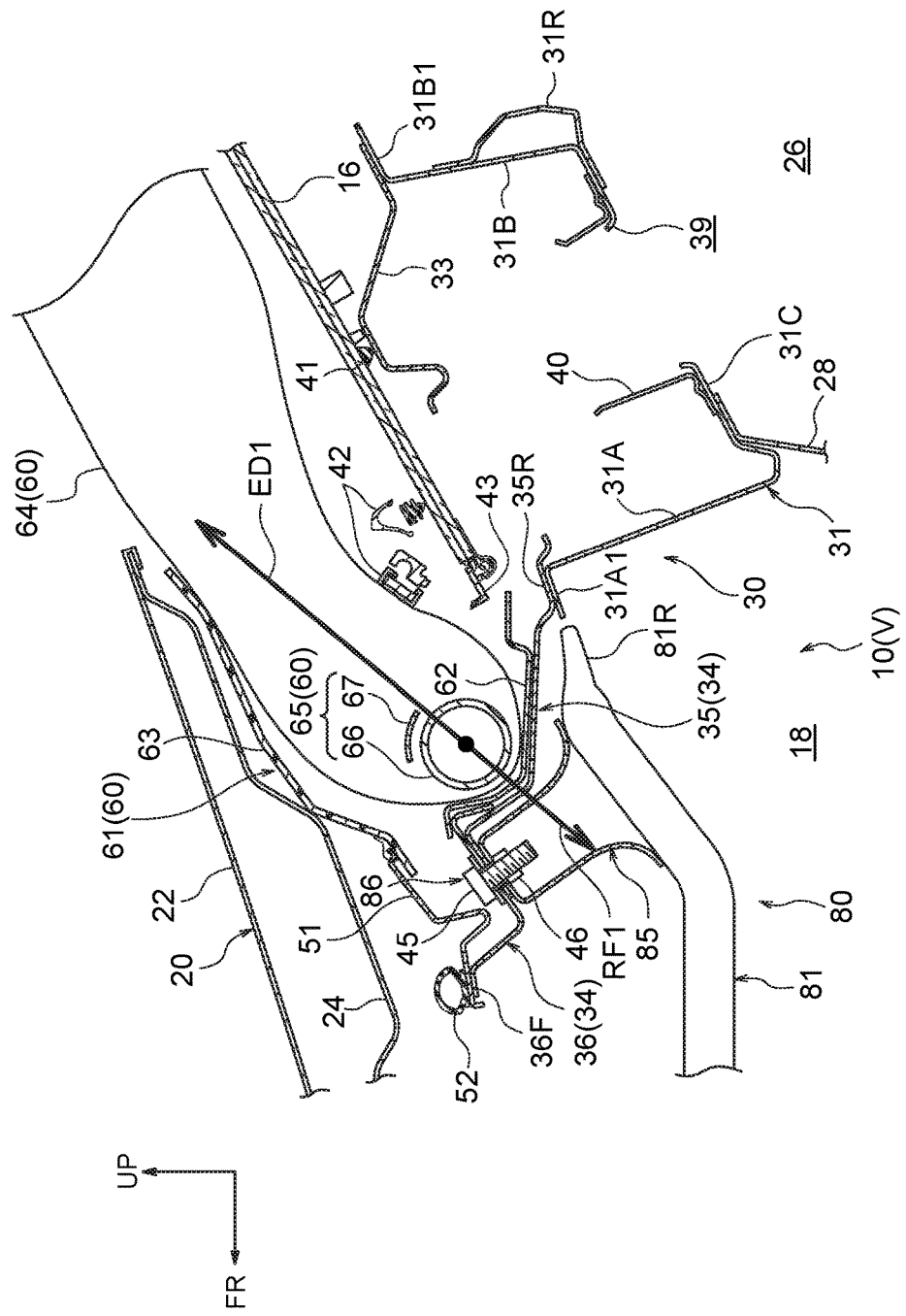
FIG. 11 is a cross-sectional view, corresponding to part of FIG. 3, for describing the deployment direction of the airbag and obliquely forward and downward reaction forces acting on inflators at the time of airbag deployment.

Here, when the inflators 65 are activated, the airbag 64 inflates and deploys obliquely in the vehicle rearward and upward direction and outwardly in the vehicle width direction (see arrows ED1 and arrows ED2 in FIG. 10). At this time, as shown in FIG. 11, obliquely forward and downward reaction forces RF1 act on the inflators 65, but the cowl front panel 34 is supported by the steering stabilizing braces 80 at the vehicle front sides relative to the rear ends 65R of the inflators 65. Because of this, deformation of the cowl 30 at the time of airbag deployment can be effectively controlled. As a result, it becomes possible to stably inflate and deploy the airbag 64 to its intended position.

Furthermore, in the present embodiment, the securing brackets 82 disposed at the front end portions of the steering stabilizing braces 80 are secured to the suspension towers 14, and the cowl fastening portions 81R disposed at the rear end portions of the steering stabilizing braces 80 are secured to the cowl panel 31. The steering stabilizing braces 80 are secured to the cowl front panel 34 at the vehicle front sides relative to the rear ends 65R of the inflators 65. Because of this, vibration of the cowl front panel 34 at the time when the inflators 65 are activated can be allowed to escape via the steering stabilizing braces 80 to a member disposed at the vehicle rear side of the cowl front panel 34, such as the cowl panel 31. As a result, deformation of the cowl 30 at the time of airbag deployment can be even more effectively controlled.

Furthermore, in the present embodiment, as shown in FIG. 12, the cowl fastening portions 81R, which are the rear end portions of the steering stabilizing braces 80, are secured to the cowl brace securing portions 84, which are the portions where the front flange 31A1 disposed on the front wall 31A of the cowl panel 31 and the cowl braces 37 are secured to each other. The cowl braces 37 are secured to the front wall 31A and the rear wall 31B of the cowl panel 31 and, together with the front wall 31A, the rear wall 31B, and the bottom wall 31C, form chambers (see region CS surrounded by the long dashed short dashed line in FIG. 12). The cowl brace securing portions 84 are reinforced by the chambers, so the cowl fastening portions 81R of the steering stabilizing braces 80 are strongly supported. Because of this, the rigidity with which the cowl front panel 34 is supported by the steering stabilizing braces 80 is improved, so deformation of the cowl 30 can be even more effectively controlled. In particular, deformation of the cowl 30 with respect to the obliquely forward and downward reaction forces RF1 can be even more effectively controlled.

Figure 13:
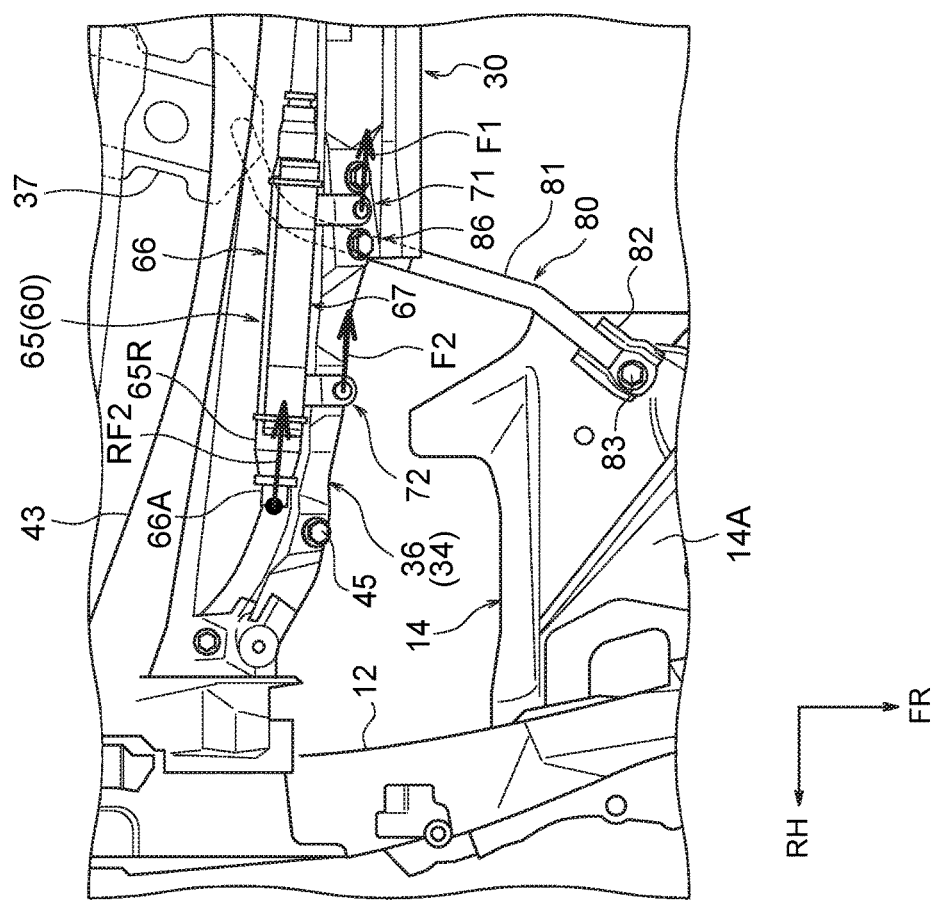
FIG. 13 is a plan view, corresponding to part of FIG. 2, for describing vehicle width direction inward reaction forces acting on the inflators at the time of airbag deployment.

Moreover, in the present embodiment, as shown in FIG. 13, the inflators 65 are fastened and secured at the front portion of the cowl front panel 34 at the inner fastening portions 71 and the outer fastening portions 72 aligned in the vehicle width direction. Vehicle width direction inward reaction forces RF2 act on the inflators 65 at the time of airbag deployment in addition to the obliquely forward and downward reaction forces RF1. At this time, vehicle width direction inward forces F1 and F2 also act on the inner fastening portions 71 and the outer fastening portions 72 of the inflators 65.

With respect to this point, in the present embodiment, the steering stabilizing brace securing portions 86, which are the portions where the steering stabilizing braces 80 and the cowl front panel 34 are secured to each other, are aligned in the vehicle width direction with the inner fastening portions 71 and the outer fastening portions 72 within the regions in the vehicle width direction where the inflators 65 are placed. Because of this, the vehicle width direction inward forces F1 and F2 can be efficiently supported by the steering stabilizing braces 80. As a result, deformation of the cowl front panel 34 caused by the forces F1 and F2 is controlled, so the effect of stabilizing the deployment direction of the airbag 64 is improved even more.

Moreover, in the present embodiment, the inflators 65 are fastened and secured to the cowl front panel 34 at the inner fastening portions 71 and the outer fastening portions 72 as described above, so the sections of the cowl front panel 34 between the inner fastening portions 71 and the outer fastening portions 72 are reinforced by the inflators 65. Additionally, the steering stabilizing brace securing portions 86 are placed in these reinforced sections. Because of this, the effect of controlling deformation of the cowl front panel 34 with respect to the forces F1 and F2 is improved compared, for example, to a case where the steering stabilizing brace securing portions 86 are placed away from and on the vehicle width direction inner sides of the inner fastening portions 71 or a case where the steering stabilizing brace securing portions 86 are placed away from and on the vehicle width direction outer sides of the outer fastening portions 72.

Figure 14:
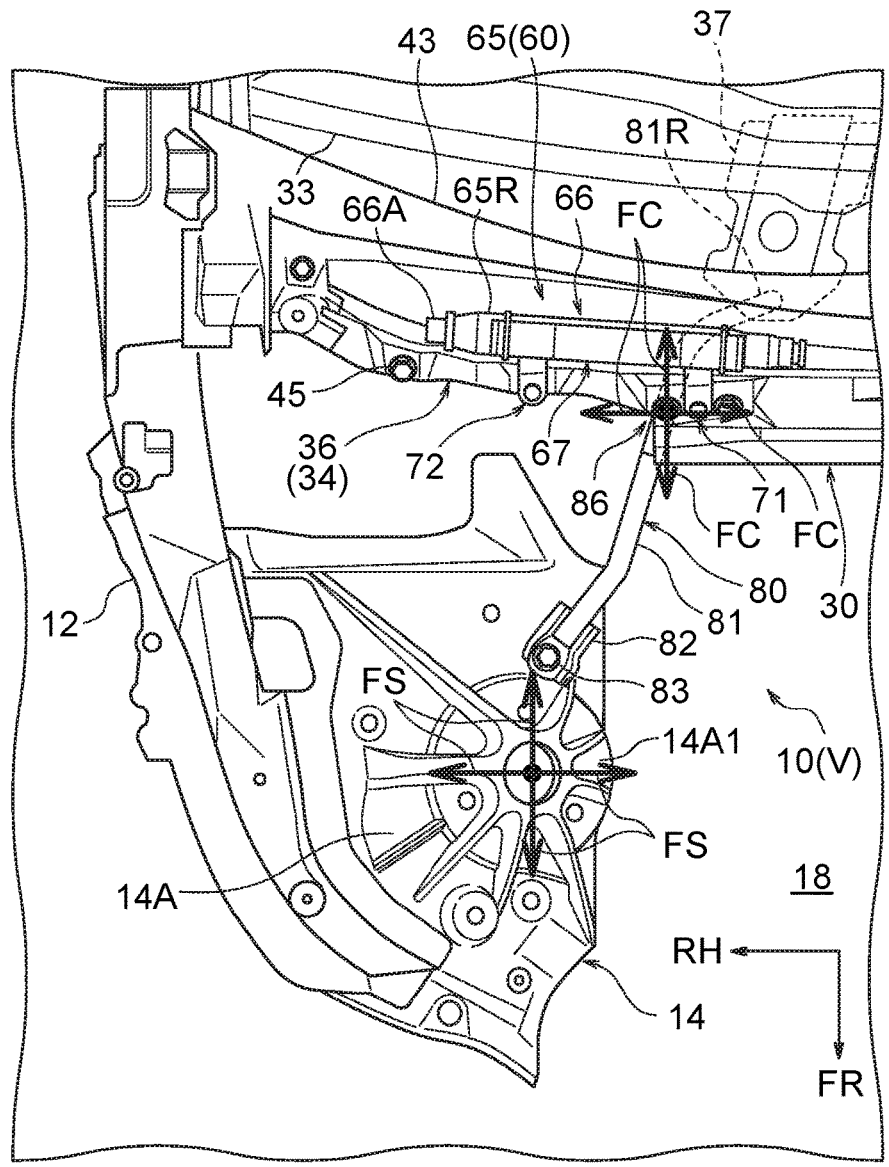
FIG. 14 is a plan view, corresponding to part of FIG. 2, for describing the reinforcement of front suspension towers at the time of normal travel.

Moreover, in the present embodiment, as shown in FIG. 14, at the time of normal travel, vehicle horizontal direction input forces FS applied from the front suspensions to the top walls 14A of the suspension towers 14 are transmitted via the steering stabilizing braces 80 to the cowl front panel 34 (see arrows FC in FIG. 14). The steering stabilizing braces 80 are secured to the sections of the cowl front panel 34 reinforced by the inflators 65 as described above, so deformation of the cowl front panel 34 at these reinforced sections is controlled, and the support rigidity of the steering stabilizing braces 80 is improved. As a result, the suspension towers 14 to which the front end portions of the steering stabilizing braces 80 are secured are reinforced by the steering stabilizing braces 80, so the steering stability and riding performance of the vehicle V can be improved.

It should be noted that the steering stabilizing braces 80 bridge the suspension towers 14 and the cowl panel 30, but because the cowl panel 30 is made of a steel sheet or the like whose sheet thickness is thin, its rigidity is not high and it tends to become deformed by the vehicle horizontal direction input forces transmitted from the suspension towers 14. In the case of a configuration where the steering stabilizing braces 80 are not secured to the portions of the cowl front panel 34 around the inflators 65, it may be difficult to sufficiently realize an improvement in steering stability and riding performance, but in the present embodiment these can be realized because of the configuration described above.

Furthermore, in the present embodiment, as shown in FIG. 11, each of the steering stabilizing braces 80 has the bracket 85 positioned obliquely on the vehicle front and lower sides of the respective inflators 65, and each bracket 85 is secured to the cowl front panel 34. Each bracket 85 is positioned in the direction in which the reaction force RF1 acts. Because of this, the reaction force RF1 can be efficiently supported by the bracket 85, so the effect of controlling deformation of the cowl 30 at the time of airbag deployment is further improved.

Figure 15:
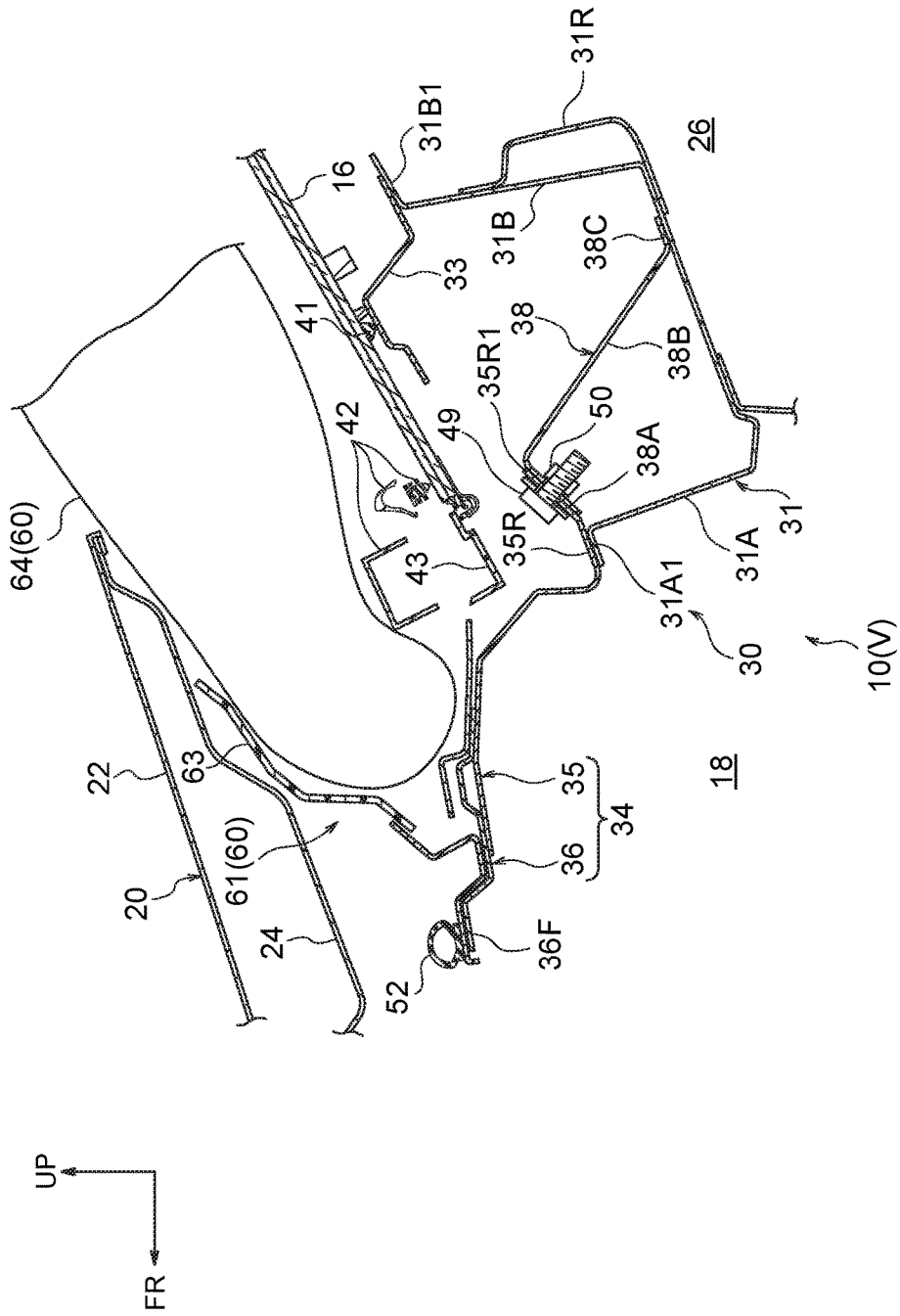
FIG. 15 is a cross-sectional view, corresponding to part of FIG. 6, showing circumstances at the time of airbag deployment.

Furthermore, in the present embodiment, as shown in FIG. 15, the front fastening portions 38A, each of which is the front end portion of the cowl bracket 38, are secured to the rear end portion 35R of the cowl front panel 34. Each cowl bracket 38 extends in the vehicle rearward direction, and the rear joining portion 38C, which is the rear end portion of the cowl bracket 38, is secured to the bottom wall 31C of the cowl panel 31. Because of this, the cowl front panel 34 is supported from the vehicle rear side via the cowl brackets 38. Because of this, the support for the reaction forces RF1 acting obliquely in the vehicle frontward and downward direction at the inflators 65 can be reinforced, so the effect of controlling deformation of the cowl 30 at the time of airbag deployment can be improved even more.

In this way, in the present embodiment, deformation of the cowl 30 caused by the obliquely forward and downward reaction forces RF1 is controlled because the inflators 65 are efficiently supported from both sides in the vehicle frontward and rearward direction, so the deployment direction of the airbag 64 can be effectively stabilized.

Furthermore, in the present embodiment, each steering stabilizing brace 80 is secured to the cowl front panel 34 on the vehicle front side relative to the rear ends 65R of the inflators 65 that are heavy objects. Because of this, vibration of the cowl front panel 34 in the vehicle upward and downward directions at the time of normal travel (see arrow U and arrow D in FIG. 9) can be effectively controlled. That is to say, in the case of a configuration where the front portion of the front panel 34 is not supported by the steering stabilizing braces 80, the cowl front panel 34 has a cantilever structure where its rear end portion 35R is supported on the cowl panel 31. For this reason, there is the potential for the front portion side of the cowl front panel 34 to vibrate a great extent in the vehicle vertical direction as the vehicle V travels and for the durability of the cowl 30 to decrease with respect to input forces during travel over many years. With respect to this point, in the present embodiment, vibration of the cowl front panel 34 is controlled, so the durability of the cowl 30 can be well ensured.

Furthermore, in the present embodiment, the front end portions of the steering stabilizing braces 80 are secured to the top walls 14A of the suspension towers 14 positioned on the upper end side of the engine compartment 18, and the steering stabilizing braces 80 extend toward the cowl 30 from the top walls 14A. Because of this, the steering stabilizing braces 80 can be disposed on the vehicle upper side of parts (engine, transmission, auxiliaries, etc.) disposed in the area around the suspension towers 14 and the cowl 30, so it is easy to ensure space for disposing the steering stabilizing braces 80 and the flexibility of setting the shape of the steering stabilizing braces 80 may be improved.

It should be noted that it is also conceivable, for example, to dispose support members that extend in the vehicle upward direction from vehicle skeleton members such as front side members joined to the lower end portions of the suspension towers 14 and to secure the support members to the cowl front panel 34. However, in the case of such a configuration, it becomes difficult to ensure space for disposing the support members due to the relationship with the aforementioned parts (engine, transmission, auxiliaries, etc.) and the flexibility of setting the shape of the support members may drop, but in the present embodiment this can be avoided.

Moreover, in the present embodiment, the steering stabilizing braces 80 for improving the steering stability of the vehicle V are also used as support members for controlling deformation of the cowl 30. For this reason, compared to a case where support members are disposed separately from the steering stabilizing braces 80, the mass of the vehicle V and the number of parts can be reduced.

It should be noted that, although in the present embodiment the steering stability brace securing portions 86, which are the portions where the steering stabilizing braces 80 and the cowl front panel 34 are secured to each other, are placed between the inner fastening portions 71 and the outer fastening portions 72 of the inflators 65, the present invention is not limited to this. That is, the steering stability brace securing portions 86 may also be placed adjacent to the vehicle width direction inner sides of the inner fastening portions 71 or may be placed adjacent to the vehicle width direction outer sides of the outer fastening portions 72. In that case, it is preferred that the steering stability brace securing portions 86 be placed as close as possible to the inner fastening portions 71 or the outer fastening portions 72. Doing so results in the same action and effects as in the first embodiment being obtained.

Furthermore, in the first embodiment, the inflators 65 are secured to the cowl front panel 34 at two fastening portions each (the inner fastening portions 71 and the outer fastening portions 72), but the present invention is not limited to this, and the inflators 65 may also be secured to the cowl front panel at three or more fastening portions.

Next, other embodiments of the present invention will be described. It should be noted that, regarding configurations and action that are basically the same as those in the first embodiment, reference signs that are the same as those in the first embodiment will be assigned thereto and description thereof will be omitted.

Second Embodiment

Figure 16:
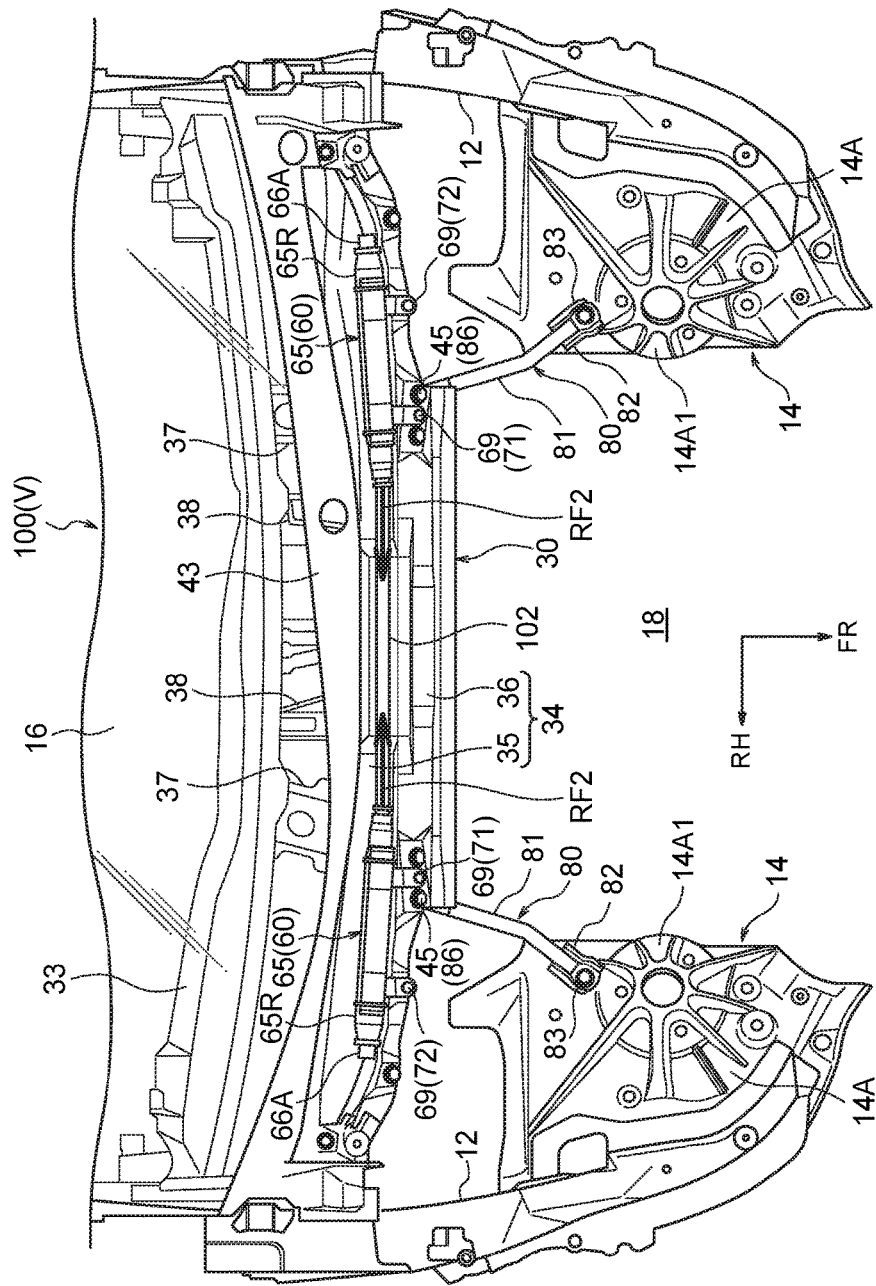
FIG. 16 is a plan view, corresponding to FIG. 2, showing a vehicle front portion structure equipped with a pedestrian airbag device pertaining to a second embodiment of the disclosure.

In FIG. 16 a vehicle front portion structure 100 equipped with a pedestrian airbag device pertaining to a second embodiment of the present invention is shown by way of a plan view corresponding to FIG. 2. This embodiment differs from the first embodiment in that it has a connection member 102 that links the right and left pair of inflators 65 in the vehicle width direction. The connection member 102 is made of a metal pipe, for example, and is placed with its longitudinal direction coinciding with the vehicle width direction between the right and left inflators 65. Both longitudinal direction end portions of the connection member 102 are secured via brackets (not shown in the drawings) to the vehicle width direction inner end portions of the right and left inflators 65. Because of this, the vehicle width direction inner end portions of the right and left inflators 65 are joined to each other by the connection member 102. It should be noted that the material of the connection member 102 is not limited to a metal pipe and can be appropriately changed, but a strong and rigid material, such as metal or fiber-reinforced plastic, is preferred. In this embodiment, configurations other than those described above are the same as those in the first embodiment.

In this embodiment, when the right and left inflators 65 discharge gas from the gas discharge portions 66A disposed in their vehicle width direction outer end portions, reaction forces RF2 applied inward in the vehicle width direction to the right and left inflators 65 act so as to compress the connection member 102 in its axial direction. Because of this, the reaction forces RF2 can be cancelled out. As a result, deformation of the cowl front panel 34 caused by the reaction forces RF2 can be controlled, which contributes even more to the effect of stabilizing the deployment direction of the airbag 64.

Third Embodiment

Figure 17:
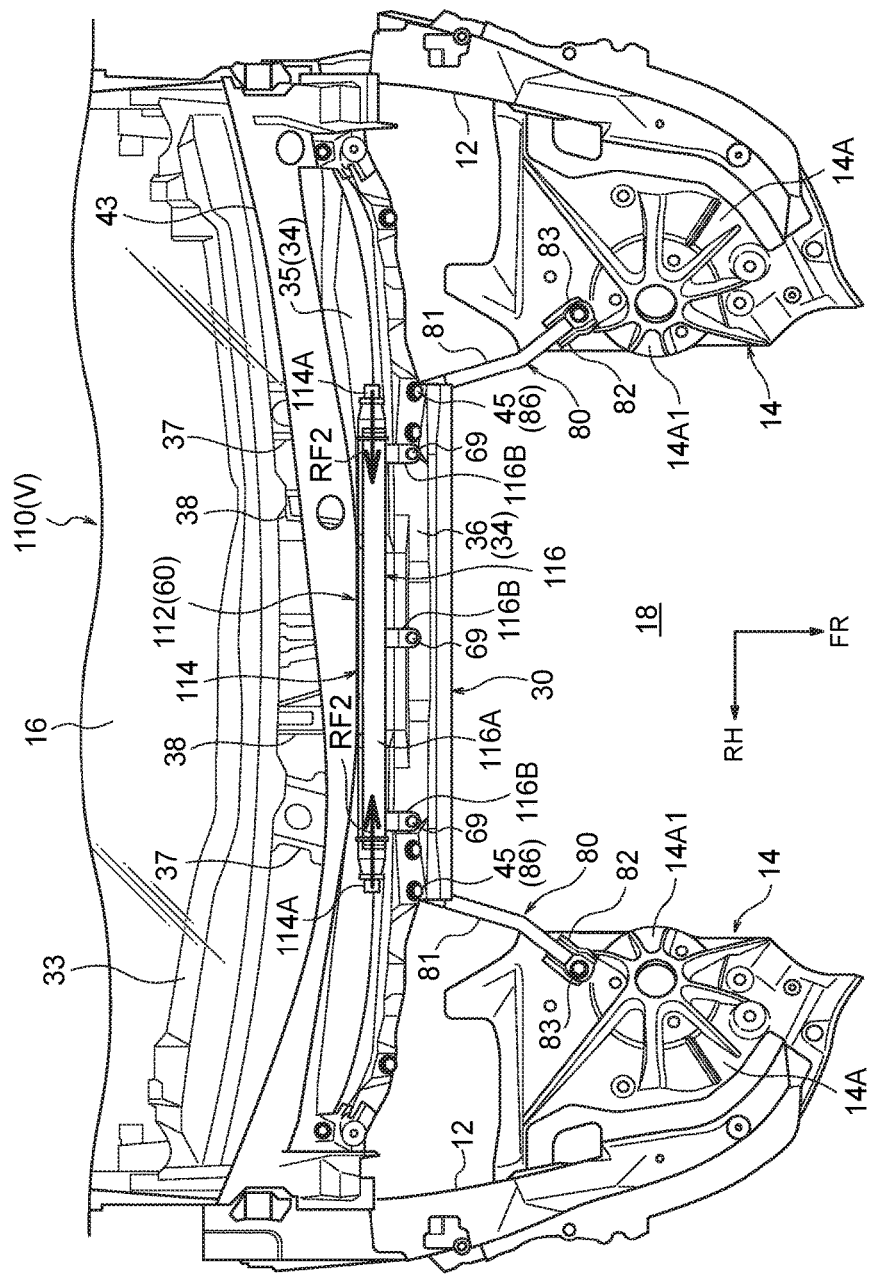
FIG. 17 is a plan view, corresponding to FIG. 2, showing a vehicle front portion structure equipped with a pedestrian airbag device pertaining to a third embodiment of the disclosure.

In FIG. 17 a vehicle front portion structure 110 equipped with a pedestrian airbag device pertaining to a third embodiment of the present invention is shown by way of a plan view corresponding to FIG. 2. The airbag module 60 pertaining to this embodiment is equipped with one inflator 112 instead of the right and left pair of inflators 65 pertaining to the first embodiment. The inflator 112 is placed in the vehicle width direction central portion of the cowl front panel 34 and has an inflator body 114 and an attachment bracket 116. The inflator body 114 is a cylinder type inflator like the inflators 65 but it has gas discharge portions 114A in both axial direction end portions and its dimension in the vehicle width direction is set larger than that of each inflator 65.

The attachment bracket 116 has the same configuration as that of the attachment brackets 67 pertaining to the first embodiment, but its dimension in the vehicle width direction is set larger than that of the attachment brackets 67. The attachment bracket 116 has a bracket body 116A, which is secured to the upper surface of the inflator body 114, and plural (here, three) fastening pieces 116B, which extend in the vehicle frontward direction from the front edge portion of the bracket body 116A. The front portions of the three fastening pieces 116B are fastened and secured to the front portion of the cowl front panel 34 using the weld bolts 69 and the nuts 70 (see FIG. 4). Because of this, the inflator 112 is fastened and secured to the front portion of the cowl front panel 34 on the vehicle front side of the inflator body 114.

When the inflator 112 is activated by the controller (not shown in the drawings), the inflator 112 discharges gas from the right and left gas discharge portions 114A. The right and left gas discharge portions 114A are placed in the neighborhoods of the vehicle rear sides of the steering stability brace securing portions 86, that is, the portions where the steering stabilizing braces 80 and the cowl front panel 34 are secured to each other. In this embodiment, configurations other than those described above are the same as those in the first embodiment.

In this embodiment, when the inflator 112 discharges gas from the right and left gas discharge portions 114A, the reaction forces RF2, which are applied inward in the vehicle width direction to both vehicle width direction end portions of the inflator 112, can be cancelled out by the inflator 112 itself. Furthermore, the right and left gas discharge portions 114A are placed in the neighborhoods of the vehicle rear sides of the right and left steering stability brace securing portions 86. Because of this, the obliquely forward and downward reaction forces RF1 (not shown in FIG. 17) applied to the right and left gas discharge portions 114A can be efficiently supported by the right and left steering stabilizing braces 80. As a result, deformation of the cowl 30 caused by the reaction forces RF1 can be effectively controlled.

<Supplemental Description of Embodiments>

In each of the embodiments, an example is described where the lower panel 35 and the upper panel 36 are joined to each other to configure the cowl front panel 34, but the present invention is not limited to this and the configuration of the cowl front panel can be appropriately changed. For example, the cowl front panel may also be configured by a single panel.

Furthermore, in the first embodiment, the suspension towers 14 (front suspension towers) are placed on the vehicle front sides of the inflators 65, and the cowl fastening portions 81R, which are the rear end portions of the steering stabilizing braces 80 (support members), are secured to the cowl panel 31, but the present invention is not limited to this. That is, for example, the front suspension towers may also be placed on the vehicle lower sides of the inflators, with one end portion of each support member being secured to the front suspension towers and the other end portion of each support member being secured to the cowl front panel.

Furthermore, in the first embodiment, the steering stability brace securing portions 86 are placed on the vehicle front sides of the inflators 65, but the present invention is not limited to this. For example, the steering stability brace securing portions 86 may also be placed on the vehicle lower sides of the inflators 65 or may be placed on the vehicle width direction inner sides of the inflators 65. However, it is preferred that the steering stability brace securing portions 86 be positioned on the vehicle front sides of the rear ends 65R of the inflators 65 that are heavy objects.

Furthermore, each of the embodiments has a configuration equipped with the right and left pair of cowl braces 37 and the right and left pair of cowl brackets 38, but the present invention is not limited to this and may also have a configuration where all or some of the right and left pair of cowl braces 37 and the right and left pair of cowl brackets 38 are omitted.

Furthermore, in each of the embodiments, the steering stabilizing braces 80 have the brackets 85 positioned obliquely on the vehicle front and lower sides of the inflators 65, and the brackets 85 are secured to the cowl front panel 34, but the present invention is not limited to this. For example, parts of the brace bodies 81 may also be bent in the vehicle upward direction and directly secured to the cowl front panel 34.

Furthermore, in each of the embodiments, the steering stabilizing braces 80 extend in the vehicle rearward direction from the top walls 14A of the suspension towers 14, but the present invention is not limited to this. For example, the steering stabilizing braces 80 may also extend in the vehicle rearward direction or the vehicle upward direction from the walls on the vehicle rear sides or the walls on the vehicle width direction inner sides of the suspension towers 14.

It goes without saying that the scope of the present invention is not limited to the embodiments.

What is claimed is:

1. A vehicle front portion structure equipped with a pedestrian airbag device, the vehicle front portion structure comprising:

a cowl comprising a cowl panel and a cowl front panel, the cowl front panel extending in a forward direction from a front end portion in a vehicle frontward and rearward direction of the cowl panel;

an inflator disposed with a longitudinal direction of the inflator coinciding with a vehicle width direction above the cowl front panel and secured to the cowl front panel;

an airbag disposed above the cowl front panel and inflated and deployed obliquely in a vehicle rearward and upward direction and outwardly in the vehicle width direction by gas discharged from the inflator; and a support member having one end portion configured to be secured to a front suspension tower, extending toward the cowl, and secured to the cowl front panel on a vehicle front side relative to a rear end of the inflator in the vehicle frontward and rearward direction.

2. The vehicle front portion structure equipped with a pedestrian airbag device according to claim 1, wherein:

the front suspension tower is configured to be placed on a vehicle front side of the inflator, and another end portion of the support member is secured to the cowl panel.

3. The vehicle front portion structure equipped with a pedestrian airbag device according to claim 2, wherein:

the cowl further comprises a cowl brace, the cowl panel includes a front wall, a rear wall, and a bottom wall, the cowl brace is secured to the front wall and the rear wall of the cowl panel, a chamber is formed by the front wall, the rear wall, the bottom wall and the cowl brace, and the other end portion of the support member is secured to a portion where the front wall of the cowl panel and the cowl brace are secured to each other.

4. The vehicle front portion structure equipped with a pedestrian airbag device according to claim 1, wherein:

the inflator is fastened and secured to the cowl front panel at at least two fastening portions aligned in the vehicle width direction, and a portion where the support member and the cowl front panel are secured to each other is aligned with at least one of the fastening portions within a region in the vehicle width direction where the inflator is placed.

5. The vehicle front portion structure equipped with a pedestrian airbag device according to claim 4, wherein the portion where the support member and the cowl front panel are secured to each other is placed between the two fastening portions of the inflator.

6. The vehicle front portion structure equipped with a pedestrian airbag device according to claim 1, wherein:

the vehicle front portion structure has a right and left pair of the inflators aligned in the vehicle width direction, and the pair of inflators discharge gas from gas discharge portions disposed in their vehicle width direction outer end portions, and their vehicle width direction inner end portions are linked by a connection member.

7. The vehicle front portion structure equipped with a pedestrian airbag device according to claim 1, wherein:

the vehicle front portion structure has a right and left pair of the support members, each support member having one end portion configured to be secured to either one of a right and left pair of the front suspension towers, and the inflator is placed at a vehicle width direction central portion of the cowl front panel and discharges gas from a right and left pair of gas discharge portions disposed in both vehicle width direction end portions of the inflator.

8. The vehicle front portion structure equipped with a pedestrian airbag device according to claim 1, wherein the support member has a support portion positioned obliquely on a vehicle front and lower side of the inflator, and the support portion is secured to the cowl front panel.

9. The vehicle front portion structure equipped with a pedestrian airbag device according to claim 1, wherein:

the cowl panel has a front wall, a rear wall, and a bottom wall, a rear end portion of the cowl front panel being secured to a front flange disposed at an upper end portion of the front wall, and the cowl further comprises a cowl bracket, one end portion of the cowl bracket being secured to the rear end portion of the cowl front panel, the cowl bracket extending in the vehicle rearward direction, and another end portion of the cowl bracket being secured to the bottom wall or the rear wall of the cowl panel.

10. The vehicle front portion structure equipped with a pedestrian airbag device according to claim 3, wherein:

a rear end portion of the cowl front panel is secured to a front flange disposed at an upper end portion of the front wall, and the cowl further comprises a cowl bracket, one end portion of the cowl bracket being secured to the rear end portion of the cowl front panel, the cowl bracket extending in the vehicle rearward direction, and another end portion of the cowl bracket being secured to the bottom wall or the rear wall of the cowl panel.

11. The vehicle front portion structure equipped with a pedestrian airbag device according to claim 1, wherein the one end portion of the support member is configured to be secured to a top wall of the front suspension tower.

* * * * *